United States Patent
Crandall et al.

(10) Patent No.: US 10,695,691 B2
(45) Date of Patent: Jun. 30, 2020

(54) SUPERCRITICAL FLUID EXTRACTION APPARATUSES AND METHODS FOR OPERATING THE SAME

(71) Applicant: Paradigm Supercritical Innovations LLC, Springfield, OR (US)

(72) Inventors: Matthias K. Crandall, Springfield, OR (US); Emerson Biehl, Springfield, OR (US)

(73) Assignee: PARADIGM SUPERCRITICAL INNOVATIONS LLC, Springfield, OR (US)

(*) Notice: Subject to any disclaimer, the term of this patent is extended or adjusted under 35 U.S.C. 154(b) by 122 days.

(21) Appl. No.: 15/709,237

(22) Filed: Sep. 19, 2017

(65) Prior Publication Data

US 2018/0085684 A1    Mar. 29, 2018

Related U.S. Application Data

(63) Continuation of application No. 14/934,728, filed on Nov. 6, 2015, now Pat. No. 9,764,249.

(60) Provisional application No. 62/085,192, filed on Nov. 26, 2014.

(51) Int. Cl.
*B01D 11/02* (2006.01)
*B01D 11/04* (2006.01)
*A61L 2/00* (2006.01)

(52) U.S. Cl.
CPC ...... *B01D 11/0203* (2013.01); *B01D 11/0207* (2013.01); *B01D 11/0284* (2013.01); *B01D 11/0296* (2013.01)

(58) Field of Classification Search
CPC ............ B01D 11/0203; B01D 11/0403; B01D 11/0292
USPC ......... 422/105, 108, 119, 256, 261–262, 292
See application file for complete search history.

(56) References Cited

U.S. PATENT DOCUMENTS

| 9,764,249 B2 * | 9/2017 | Crandall ............ B01D 11/0203 |
| 2004/0147767 A1 * | 7/2004 | Whittle .............. B01D 11/0242 549/390 |
| 2011/0120686 A1 | 5/2011 | Zoch et al. |

(Continued)

OTHER PUBLICATIONS

"Skunk Pharm Research LLC Research and Development One Safety Meeting at a Time", 34 pages, Skunk Pharm Research LLC, http://skunkpharmresearch.com/affordable-diy-co2-extraction/, retrieved Jul. 23, 2015 (first publication date unknown).

(Continued)

*Primary Examiner* — Monzer R Chorbaji
(74) *Attorney, Agent, or Firm* — Schwabe, Williamson & Wyatt, P.C.

(57) ABSTRACT

A supercritical fluid extraction (SFE) apparatus is provided that is capable of being operated in a continuous and/or steady-state fashion. The SFE apparatus may include an extraction assembly. The extraction assembly may include a first extraction chamber (FEC) to contain a first amount of source material from which a compound is to be extracted, and a second extraction chamber (SEC) to contain a second amount of the source material. The extraction assembly may include a valve to control a flow of a solvent into the FEC or the SEC. The SFE apparatus may include a collection chamber that is mounted substantially perpendicular to the extraction assembly. Other embodiments are described.

20 Claims, 6 Drawing Sheets

(56) References Cited

U.S. PATENT DOCUMENTS

2014/0004605 A1    1/2014  Donohue et al.

OTHER PUBLICATIONS

ASCO Carbon Dioxide LTD, "The 3 Phases of CO2", (Date), 4 pages, www.ascoco2.com, retrieved Sep. 17, 2015 (first publication date unknown).
S. Bristow et al., "Analysis of the supersaturation and precipitation process with supercritical CO2", 2001, 15 pages (pp. 257-271), Journal of Supercritical Fluids 21, Bradford, UK.
Eden Labs LLC, "Hi-Flo CO2 Systems," http://edenlabs.com/equipment/co2-units, (c) 2013, 15 pages, retrieved Sep. 17, 2015 (first publication date unknown).
J. P. Friedrich et al., "Supercritical CO2 Extraction of Lipid-Bearing Materials and Characterization of the Products", Feb. 1984, 6 pages (pp. 223-228), JAOCS, vol. 61, No. 2, Peoria, IL.
Hyvair Corp., "Hyrdaulic Pneumatic Fluid Power Data," http://www.hyvair.com/fluidpower.html, retrieved Sep. 17, 2015, 2 pages, retrieved Sep. 17, 2015 (first publication date unknown).
Helene Perrotin-Brunel et al., "Solubility of Cannabinol in Supercritical Carbon Dioxide", 2010, 4 pages (pp. 3704-3707), Journal of Chemical & Engineering Data, vol. 55, No. 9.
Helene Perrotin-Brunel et al., "Solubility of Δ9-tetrahydrocannabinol in supercritical carbon dioxide: Experiments and modeling", 2010, 5 pages (pp. 6-10), Journal of Supercritical Fluids 52.
Jeff Sczechowski et. al, "Supercritical CO2 Extraction", Mar. 7, 1997, 4 pages, http://www.calpoly.edu/~ceenve/enve/supercrit.html, San Luis Obispo, CA, retrieved Sep. 9, 2015.

* cited by examiner

SUPERCRITICAL FLUID EXTRACTION APPARATUSES AND METHODS FOR OPERATING THE SAME

CROSS REFERENCE TO RELATED APPLICATIONS

This application is a continuation of U.S. application Ser. No. 14/934,728, entitled, "SUPERCRITICAL FLUID EXTRACTION APPARATUSES AND METHODS FOR OPERATING THE SAME," filed Nov. 6, 2015, now U.S. Pat. No. 9,764,249, which claims priority to U.S. Provisional Patent Application No. 62/085,192 entitled "DUAL CHAMBER SUPERCRITICAL CO2 OIL EXTRACTOR, WITH INLINE FRACTION SYSTEM AND INLINE CONDENSING," filed Nov. 26, 2014, the disclosures of each of which are incorporated herein by reference in their entireties.

FIELD

Embodiments herein relate to the field of supercritical fluid extraction apparatuses, and, more specifically, to supercritical fluid extraction apparatuses that may be operated in a continuous and/or steady-state fashion.

BACKGROUND

A fluid becomes supercritical when it is compressed to a pressure and elevated to a temperature greater than that of its critical point. Supercritical fluids (SCFs) exhibit properties of both a liquid and a gas. An SCF has a relatively high liquid-like density, and because solubility usually increases with density and pressure, SCFs have a high absorption capacity. The gas-like properties of high diffusivity and low viscosity allow for high mass transfer rates between a solute and an SCF. SCFs having a high rate of absorption are widely used in organic compound extraction.

Supercritical fluid extraction (SFE) is the process of separating a component or compound from a source material (also referred to as a "matrix," a "raw material," and the like) using supercritical fluids as a solvent. The source material may be a solid or liquid material. In many cases, the compound may be a desired product, such as a lipid, essential oil, and the like. In other cases, the compound could be an undesired product, for example, caffeine for decaffeinated coffee products. Devices used to extract compounds from source materials may be referred to as SFE apparatuses.

Many SFE apparatuses use supercritical carbon dioxide ($CO_2$) as a solvent for the extraction of compounds. Such SFE apparatuses typically include a pump that is powered by an air compressor, a $CO_2$ supply that may include one or more tanks of $CO_2$, a heating element, a single extraction chamber, an air cooling device, and a single collection chamber. Extraction techniques using the typical SFE apparatuses may include filling the extraction chamber with source material and pumping $CO_2$ into the extraction chamber. Prior to entering the extraction chamber, the $CO_2$ may enter a compressor to be compressed and heated until it reaches the supercritical phase. In some cases, a heating element may heat the extraction chamber so that the $CO_2$ enters the supercritical phase while inside the extraction chamber. The supercritical $CO_2$ becomes saturated with a compound as it moves through the extraction chamber and comes into contact with the source material. The supercritical $CO_2$ saturated with a compound may be referred to as a "composition." The composition may then flow into the collection chamber where the composition drops in pressure. The drop in pressure causes the $CO_2$ to enter a liquid phase and separate from the compound. At this point, the compound may enter a liquid or solid phase depending on the chemical characteristics of the compound. The liquid $CO_2$ may then be "burned off" as a gas to be vented or re-condensed in a storage tank for recirculation. These collection chambers may be referred to as "two phase collection chambers" because the solvent undergoes two phase changes while inside the collection chamber. Once the compound is completely extracted from the source material, the SFE apparatus undergoes a decompression operation so that the material remaining in the extraction chamber may be removed, and new source material may be placed into the extraction chamber. Once new source material is placed in the extraction chamber, the extraction process may start again by pumping new or recycled $CO_2$ into the extraction chamber. The decompression operations and the compression operations of most SFE apparatuses may relatively time consuming. For example, most SFE apparatuses take approximately one hour to decompress to a point where the extraction chamber may be opened. Additionally, from the decompressed state, most SFE apparatuses take approximately 20-30 minutes to compress the $CO_2$ to enter the supercritical phase. The aforementioned process may be referred to as a "batch operation."

The amount of compound(s) that may be extracted using typical SFE apparatuses and typical extraction methods may be limited by the chemical properties of the source material and/or the chemical properties of the compound sought to be extracted. The properties of the source material and/or the compound may inform the amount of solvent to be used and/or an amount of processing time required for extracting the compound(s). For example, compounds that are heavy fatty acids, such as cannabinoids, may be difficult to solubilize using a typical SFE solvent, such as $CO_2$. Source materials comprising such compounds may require relatively large quantities of solvents and/or relatively long processing times for extraction of these compounds. Currently, the typical extraction methods using the typical SFE apparatuses are insufficient to meet the current demand for extracts due to the relatively long processing times. Furthermore, because the typical extraction methods using the typical SFE apparatuses include burning off gaseous $CO_2$, the end product obtained using the typical extraction methods may include some contaminants because such contaminants may be too heavy to burn off with the gaseous $CO_2$.

One technique used to reduce processing times includes increasing a size or volume of the extraction chamber so that the extraction chamber may hold more source material than smaller extraction chambers. Since a larger extraction chamber may hold more source material, some processing time may be saved in reducing a number of times that the SFE apparatus has to be decompressed. However, increasing the size and/or volume of an extraction chamber does not increase the rate of extraction because the rate of extraction is dependent on the flow rate of the solvent. Furthermore, increasing the size and/or volume of the extraction chamber may dramatically increase manufacturing costs associated with constructing the extraction chamber. This is because, in order to keep the $CO_2$ in the supercritical phase, a thickness of the extraction chamber walls needs to increase as the extraction chamber becomes larger. Therefore, in many cases, the costs associated with constructing a relatively large extraction chamber may outweigh the perceived benefits. Another technique used to reduce processing times includes increasing a flow rate of the solvent in order to achieve a higher rate of extraction. However, increasing the flow rate of the solvent usually requires a larger and/or more powerful pump to be used in the SFE apparatus. Because more powerful pumps typically consume more energy (i.e., fossil fuels) than less powerful pumps, operating costs associated with operating a more powerful pump may be prohibitive. Furthermore, in typical SFE apparatuses, the flow rate is required to match the burn off rate of the solvent. In these cases, increases in the flow rate may be limited because of the time required for liquid solvents to undergo a phase change and burn off as a gas, for example, $CO_2$ entering a collection chamber as a liquid and being burned off as a gaseous $CO_2$. Yet another technique used to reduce processing times includes using cosolvents, such as ethanol and/or hexane, in addition to $CO_2$ to speed up the saturation rate of the supercritical $CO_2$ thereby increasing the rate of extraction. However, the use of cosolvents may introduce contaminates into the extracted compound(s). Moreover, using cosolvents may require extensive post-processing in order to purify the extracted compound. This extensive post-processing may also require additional pumps and chemical additives, which may increase the costs associated with using cosolvents.

In addition to relatively long processing times, another drawback associated with typical SFE apparatuses includes environmental degradation. As mentioned previously, after the compound separates from the supercritical $CO_2$, the $CO_2$ may enter a gaseous phase and is then vented, thereby releasing $CO_2$ into the atmosphere. Even if the gaseous $CO_2$ is condensed and recirculated through the SFE apparatus, once the compound is completely extracted from the source material, the SFE apparatus is decompressed, thereby releasing $CO_2$ into the atmosphere. This is due to the limiting factor that typical SFE apparatuses containing two phase collection chambers are relatively slow due to the time required for re-condensing solvents from a gaseous state back to a liquid state for recirculation. Therefore, by allowing the gaseous solvent to be released into the atmosphere, an overall processing time may be decreased. However, as is known, the release of $CO_2$ into the atmosphere contributes to anthropogenic climate change, which may contribute to sea level rise, extreme weather, and/or other like negative environmental impacts.

BRIEF DESCRIPTION OF THE DRAWINGS

Embodiments will be readily understood by the following detailed description in conjunction with the accompanying drawings and the appended claims. Embodiments are illustrated by way of example and not by way of limitation in the figures of the accompanying drawings.

DETAILED DESCRIPTION

Figure 1:
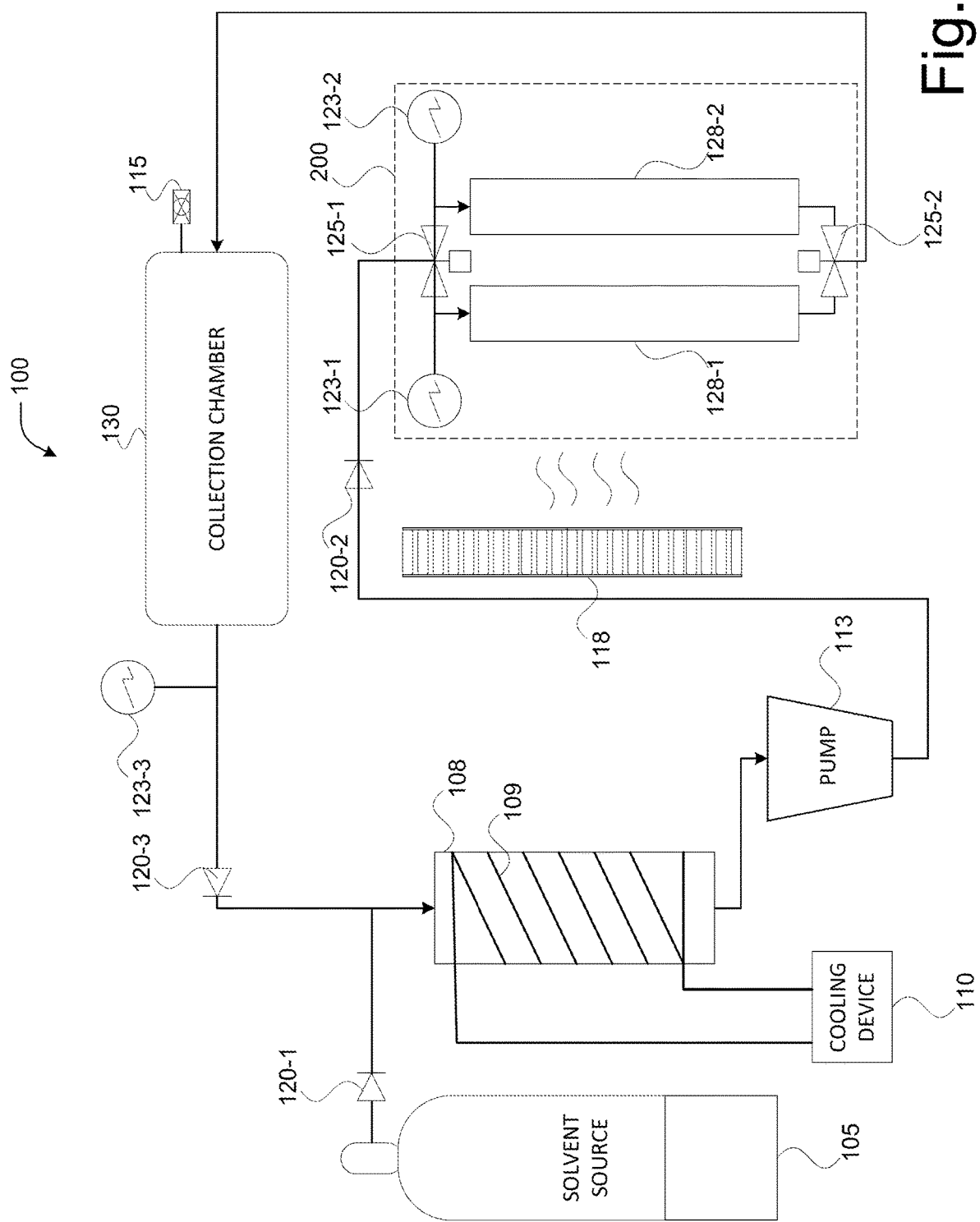
FIG. 1 illustrates a schematic of a supercritical fluid extraction (SFE) apparatus in accordance with various embodiments.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous, and are generally intended as "open" terms (e.g., the term "including" should be interpreted as "including but not limited to," the term "having" should be interpreted as "having at least," the term "includes" should be interpreted as "includes but is not limited to," etc.).

With respect to the use of any plural and/or singular terms herein, those having skill in the art can translate from the plural to the singular and/or from the singular to the plural as is appropriate to the context and/or application. The various singular/plural permutations may be expressly set forth herein for sake of clarity.

Embodiments herein provide a supercritical fluid extraction (SFE) apparatus that may include, inter alia, an extraction assembly. The extraction assembly may include at least two extraction chambers and a valve to control the flow of a solvent into one of the at least two extraction chambers. The solvent may be used to extract a compound from a source material contained in the extraction chambers. The solvent may be alternately supplied to each extraction chamber, such as by supplying the solvent to a first extraction chamber and then recirculating the solvent from the first extraction chamber to the second extraction chamber. In other words, the SFE apparatus of the example embodiments may be operated continuously or in a steady-state fashion, as opposed to typical SFE apparatuses that are only capable of operating in a batch-wise manner. In this way, the source material within the extraction chambers may be replaced without requiring the SFE apparatus to undergo a decompression operation. This is beneficial because it may reduce overall processing time for extracting compound(s) from the source material by reducing the number of decompression operations that take place. Additionally, the example embodiments may also reduce an environmental impact associated with the extraction process by, for example, reducing a total amount of solvent used for the extraction process. Further, each time the SFE apparatus undergoes the decompression operation, the solvent in a gaseous state is released into the atmosphere, which may lead to environmental degradation when the solvent is a greenhouse gas, such as carbon dioxide ($CO_2$). Because the example embodiments may reduce how often the SFE apparatus must undergo a decompression operation, the example embodiments may reduce a total amount of greenhouse gas released into the atmosphere.

Embodiments herein provide that the SFE apparatus may include a collection chamber, which may be mounted substantially perpendicular to the extraction assembly. This orientation may increase a surface area for collecting the extracted compound. This is especially beneficial in that more compound(s) may be collected in the collection chamber without increasing the overall size and/or volume of the collection chamber. Furthermore, the collection chamber may include multiple fractions within the collection chamber and/or sequential fractionation. This is beneficial in that it may allow a greater amount of compound to be separated out of from a solvent and may allow for multiple target compounds to be collected.

FIG. 1 illustrates a schematic of a supercritical fluid extraction (SFE) apparatus 100 in accordance with various embodiments. The SFE apparatus 100 includes solvent source 105; condensing chamber 108; coil 109; cooling device 110; pump 113; ball valve 115; heating element 118; extraction assembly 200; check valves 120-1 to 120-3 (collectively referred to as "check valves 120"); pressure gauges 123-1 to 123-3 (collectively referred to as "pressure gauges 123"); control valves 125-1 and 125-2 (collectively referred to as "control valves 125"); extraction chambers 128-1 and 128-2 (collectively referred to as "extraction chambers 128"); and collection chamber 130. The extraction assembly 200 of the SFE apparatus 100 includes the extraction chambers 128; pressure gauges 123-1 to 123-2; and the control valves 125.

The lines connecting the components of FIG. 1 may represent hoses, pipes, tubes, fluid transfer lines, or any other like device(s) for fluid conveyance. Such fluid conveyance devices may be manufactured from stainless steel and/or aeronautic/medical grade aluminum, and may also be lined with polytetrafluoroethylene (PTFE). The size, shape, length, inner diameter, outer diameter, etc. of such fluid conveyance devices may be chosen according to various designed choices.

Solvent source 105 supplies a solvent, such as $CO_2$, to the SFE apparatus 100. In some embodiments, solvent source 105 may be any suitable storage tank (or a plurality of tanks) capable of storing gaseous or liquid solvent. Such storage tanks are generally well known, and a description of the functionality of such devices is omitted for brevity.

During system start-up, the solvent supplied by the solvent source 105 may flow into the condensing chamber 108. The condensing chamber 108 (also referred to as a "surge tank," "surge chamber," "surge/condensing chamber," and the like) may regulate the temperature and/or pressure of the supplied solvent. During system start-up, the condensing chamber 108 may reduce the temperature of the supplied solvent such that the solvent enters or maintains a liquid phase. During system operation, the condensing chamber 108 may reduce the temperature and/or pressure of recirculated solvent from the collection chamber 130 such that the solvent maintains a liquid phase. The condensing chamber 108 may include one or more plugs at a top portion of the condensing chamber 108 (also referred to as an "inlet portion") and/or a bottom portion of the condensing chamber 108 (also referred to as an "outlet portion"), which may be retained or held in place by one or more caps (not shown). In such embodiments, a coil adapter or a fluid conveyance device nozzle may connect to the condensing chamber 108, which may allow the solvent to enter the condensing chamber 108, disperse to the outer walls of the condensing chamber 108 to be cooled, and exit the condensing chamber 108 once cooled. In some embodiments, the condensing chamber 108 may include a threaded inlet and a threaded outlet or other like openings to allow such coil adapters and/or fluid conveyance device nozzles to connect thereto. Condensing chambers and/or surge tanks are generally well known, and a description of the functionality of such devices is omitted for brevity. However, it should be noted that in various embodiments, the condensing chamber 108 may include a suitable pressure regulator to automatically cut off the flow of solvent into the condensing chamber 108 once the solvent within the condensing chamber 108 reaches or exceeds a desired pressure.

Coil 109 and cooling device 110 may be a condenser, condensing unit, or any other suitable heat exchange device capable of reducing a temperature of a substance to condense the substance from a gaseous phase to a liquid phase or capable of maintaining a liquid phase or the substance. In some embodiments, the coil 109 may be wrapped around the outside of the condensing chamber 108, while in other embodiments the coil 109 may be contained inside the condensing chamber 108. The cooling device 110 may supply a coolant, such as water, a refrigerant (e.g., ammonia (American Society of Heating, Refrigerating, and Air-Conditioning Engineers (ASHRAE) R717), liquid $CO_2$ (ASHRAE R744), dichlorodifluoromethane (ASHRAE R-12), tetrafluoroethane (ASHRAE R-134a), etc.), or any other suitable material to the coil 109. In this regard, the cooling device 110 may comprise any suitable pump, such as a pneumatically driven pump, to provide the refrigerant to the coil 109. During system start-up, latent heat may be transferred from the supplied solvent to the coolant within the coil 109 thereby causing the solvent in the condensing chamber 108 to condense and enter or maintain a liquid phase. During system operation, when solvent is recirculated to the condensing chamber 108 from the collection chamber 130, latent heat of the recirculated solvent may be transferred to the coolant, thereby causing the recirculated solvent in the condensing chamber 108 to maintain the liquid state.

Pump 113 may be any device capable of pumping liquid solvent from the condensing chamber 108 to the extraction chambers 128 and pressurizing the liquid solvent to a desired pressure. In some embodiments, the pump 113 may be a pneumatically driven dual-piston pump; however, any other suitable pump (or pumps) capable of moving fluid through a piping system may be used. Pumps are generally well known, and a description of the functionality of such a device is omitted for brevity. However, it should be noted that a size and/or volume of the extraction chamber 128 may require a pump 113 that is capable of delivering the solvent to the extraction chambers 128 at a desired flow rate. For example, in some embodiments, the desired flow rate may be a flow rate in a range of approximately 4 liters per minute (Lpm) to approximately 8 Lpm when the volume of the extraction chambers 128 is approximately 1 liter (L) to approximately 3 L. Additionally, the pump 113 may include an air compressor (not shown), which may be capable of pressurizing the SFE apparatus 100 to a desired pressure. In embodiments where the solvent is liquid $CO_2$ and the compound to be extracted comprises cannabinoids such as Cannabinol (CBN) and/or (−)-Δ9-tetrahydrocannabinol (Δ9-THC), the pump 113 may be capable of moving the liquid $CO_2$ through the SFE apparatus 100 at approximately 4 Lpm to approximately 8 Lpm and at approximately 1900 psi to approximately 3800 psi (approximately 13.2 megapascals (MPa) to approximately 26 MPa).

Ball valve 115, check valves 120, and control valves 125 may be devices configured to direct, control, and/or regulate the flow of fluids into various components of the SFE apparatus 100. Ball valve 115 may control or regulate the flow of a fluid according to an orientation of a pivoting ball within the ball valve 115. The pivoting ball may have a perforation or hole, which allows for the flow of fluid when aligned with an opening of the ball valve 115 and stops the flow of fluid when turned 90 degrees to the flow of the fluid. The orientation of the pivoting ball may be controlled manually by a valve handle or lever, or may be electronically controlled. Check valves 120 may be valves used to allow fluid to flow in a single direction while reducing or preventing the fluid from flowing in an opposite direction. Control valves 125 may be valves that control flow, pressure, temperature, and/or liquid level by fully or partially opening or closing in response to signals received from controllers that compare a desired set point to current conditions, which may be provided to the controller by sensors that monitor changes in such conditions. In various embodiments, other valves instead of or in addition to those shown by FIG. 1 may be used in the SFE apparatus 100 without departing from the example embodiments. For example, in some embodiments, a ball valve 115 may be placed between the pump 113 and the check valve 120-2, a ball valve 115 may be placed between the check valve 120-3 and the condensing chamber 108, the control valve 125-2 may be excluded or omitted, and/or the like.

Pressure gauges 123 may be any suitable pressure measuring instrument, such as a hydrostatic pressure gauge, a mercury manometer, or an electronic pressure sensor, including for example, piezoresistive strain gauges, capacitive gauges, piezoelectric gauges, Pirani gauges, thermocouple gauges, and the like. Such pressure gauges are generally well known, and a description of the functionality of such devices is omitted for brevity. However, it should be noted that pressure gauge 123-1 may be used to measure the pressure within the extraction chamber 128-1; pressure gauge 123-2 may be used to measure the pressure within the extraction chamber 128-2; and pressure gauge 123-3 may be used to measure the pressure within the collection chamber 130. In various embodiments, many more or fewer pressure gauges than those shown by FIG. 1 may be used in the SFE apparatus 100 without departing from the example embodiments.

Heating element 118 may be any suitable heat exchange device capable of transferring heat to a fluid. In this regard, the heating element 118 may comprise any suitable pump, which may be pneumatically driven (not shown) to provide a heated fluid to a heating coil or a heater core. Such heat exchange devices are generally well known, and a description of the functionality of such devices is omitted for brevity. However, it should be noted that, when the solvent is provided to one of the extraction chambers 128, the heating element 118 may be used to heat the extraction chambers 128 such that the solvent contained within one of the extraction chambers 128 reaches a critical temperature (or within some acceptable range around the critical temperature). This is because, when a solvent is at or near a critical pressure, the solubility of compounds increases as temperature increases. Some compounds may require regulation of a temperature (or a range of temperatures) to obtain solubility efficiencies. Such compounds may have a cross over point, which may be a temperature (or rang of temperatures) and a pressure (or range of pressures) to achieve maximum solubility for those compounds. When the pressure is above the cross over point, such compounds may require higher temperatures to increase solubility, while other compounds may require lower temperatures to increase solubility. For example, in embodiments where the solvent is liquid $CO_2$ and the compound to be extracted comprises cannabinoids such as CBN and/or Δ9-THC, the heating element 118 may be capable of heating the liquid $CO_2$ inside the extraction chambers 128 to a temperature of approximately 41 degrees Celsius (° C.) to approximately 72° C. (approximately 315 Kelvins (K) to approximately 345 K). The increase in temperature may increase the solubility of the cannabinoids at a given pressure, such as a cross over pressure.

The extraction chambers 128 may be devices configured to contain a source material from which a compound is to be extracted. Referring to FIG. 1, the dotted line surrounding the extraction chambers 128; the pressure gauges 123-1 to 123-2; and the control valves 125 may be referred to as an "extraction assembly," "extraction subassembly," and the like. The extraction chambers 128 are shown and described in more detail with regard to FIG. 2.

Figure 2:
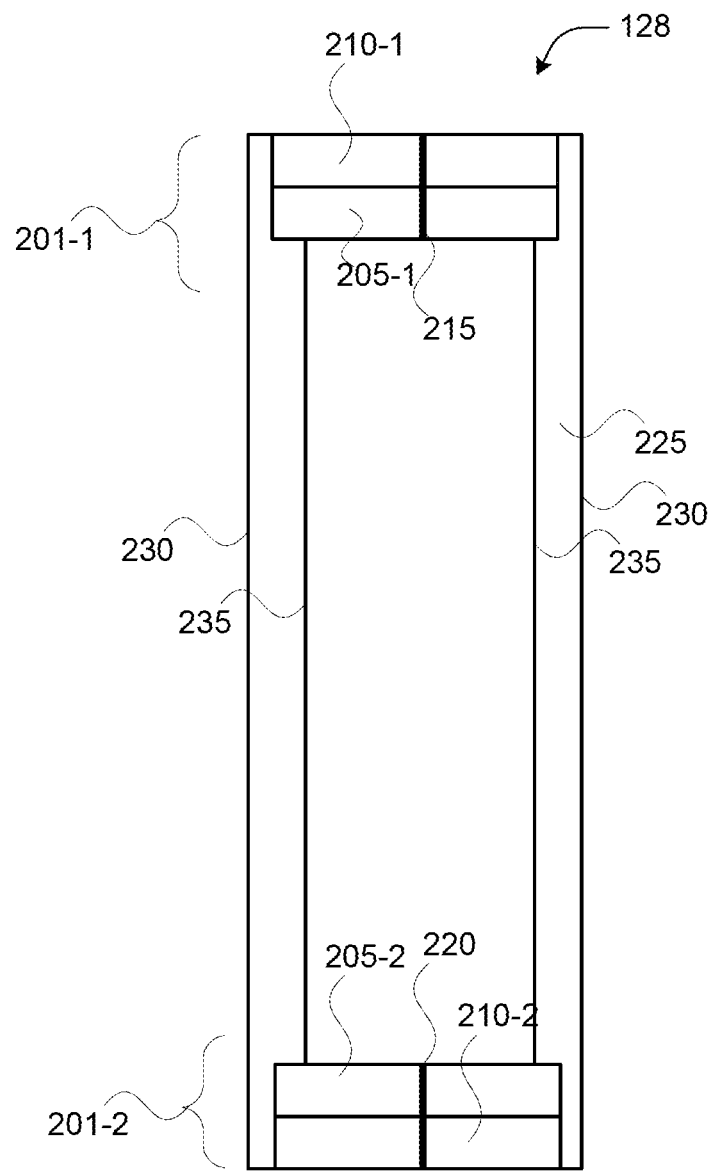
FIG. 2 illustrates the components of an extraction chamber, in accordance with various embodiments.

FIG. 2 illustrates the components of an extraction chamber 128, in accordance with various embodiments. The extraction chamber 128 may include a body 225 with outer walls 230 and inner walls 235; plugs 205-1 and 205-2 (collectively referred to as "plugs 205"); caps 210-1 and 210-2 (collectively referred to as "caps 210"); inlet 215; and outlet 220. The extraction chamber 128 may also include an inlet portion 201-1 and an outlet portion 201-2.

The plugs 205 may be used to seal the extraction chamber 128 utilizing a seal (not shown) in order to maintain the pressure inside the extraction chamber 128 and/or to prevent or reduce an amount of solvent and/or source material from escaping the extraction chamber 128. The caps 210 may be placed in the extraction chamber to retain the plugs 205. The caps 210 and the plugs 205 may be coupled with the extraction chamber 128 utilizing threads, wherein the caps 210 and the plugs 205 may include external (male) threads and the inner wall 235 may include internal (female) threads (not shown). Such threads may be tapered according to the National Pipe Thread Taper (NPT) standards. However, the example embodiments are not limited thereto, and in various embodiments, any type of fastener(s) may be used to couple the caps 210 and plugs 205 to the body 225. Furthermore, such threads may enable an operator of the SFE apparatus to unscrew the caps 210 and plugs 205 in order to place source material in the extraction chamber 128 and/or remove an end product from the extraction chamber 128.

The inlet portion 201-1 may include an inlet 215. Inlet 215 may be an opening through which the solvent may enter the extraction chamber 128. The outlet portion 201-2 may include an outlet 220. The outlet 220 may be an opening through which a composition (e.g., a combination of the solvent and the compound to be extracted from the source material) may exit the extraction chamber 128. Fluid conveyance device nozzles may connect to the inlet 215 and the outlet 220 to enable the transfer of solvent/composition into/out of the extraction chamber 128. In some embodiments, the inlet 215 and the outlet 220 may be threaded to allow such fluid conveyance device nozzles to connect thereto.

In some embodiments, the extraction chamber 128 may also include a filter to filter, block out, or otherwise reduce an amount of one or more unwanted compounds from leaving the extraction chamber 128. Such a filter (or filters) may be disposed between the cap 210-2 and the plug 205-2 or between the caps 210 and plugs 205 of both the inlet portion 201-1 and the outlet portion 201-2 (not shown). In such embodiments, in addition to the caps 210, a filter plug collar may also be attached to the plugs 205 to hold the filters in place.

In various embodiments, the extraction chamber 128 may have a generally cylindrical or tube shape; however, the extraction chambers 128 may be formed to have any suitable shape. The volume of the extraction chamber 128 may be empirically derived based on an extraction yield percentage. The extraction yield percentage may be a ratio of a desired amount of compound to be extracted to the amount of source material required to obtain the desired amount of compound. Accordingly, in various embodiments, the size and/or volume of the extraction chambers 128 may be based on a desired amount of compound to be extracted. For example, most cannabinoids have an extraction yield percentage of about 10%. Therefore, if a desired amount of cannabinoids to be extracted from an extraction chamber 128 is 50 grams (g), then the extraction chamber 128 may be required to hold 500 g of source material. In some embodiments, a 2.5 liter (L) extraction chamber 128 may be capable of holding 500 g of source material from which cannabinoids may be extracted. It should also be noted that, in most embodiments, each extraction chamber 128 may have a same or similar size, shape, and/or volume. However, in some embodiments each extraction chamber 128 may have a different size, shape, and/or volume. Furthermore, the extraction chambers 128 may be manufactured, constructed, or otherwise formed of aeronautic and/or medical grade aluminum (e.g., aluminum alloy 6061), stainless steel, and/or any other suitable material.

Referring back to FIG. 1, the collection chamber 130 may be a device configured to collect a composition and enable separation of a compound from the composition. In various embodiments, the collection chamber 130 may have a generally cylindrical shape and may have a volume in the range of approximately 1 L to approximately 3 L. However, it should be noted that the collection chamber 130 may have any suitable size, shape, and/or volume in accordance with other example embodiments. The collection chamber 130 may be manufactured, constructed, or otherwise formed of aeronautic and/or medical grade aluminum (e.g., aluminum alloy 6061), stainless steel, and/or any other suitable material. The internal structure of the collection chamber 130 is shown and described in more detail with regard to each of FIGS. 3-5.

Figure 3:
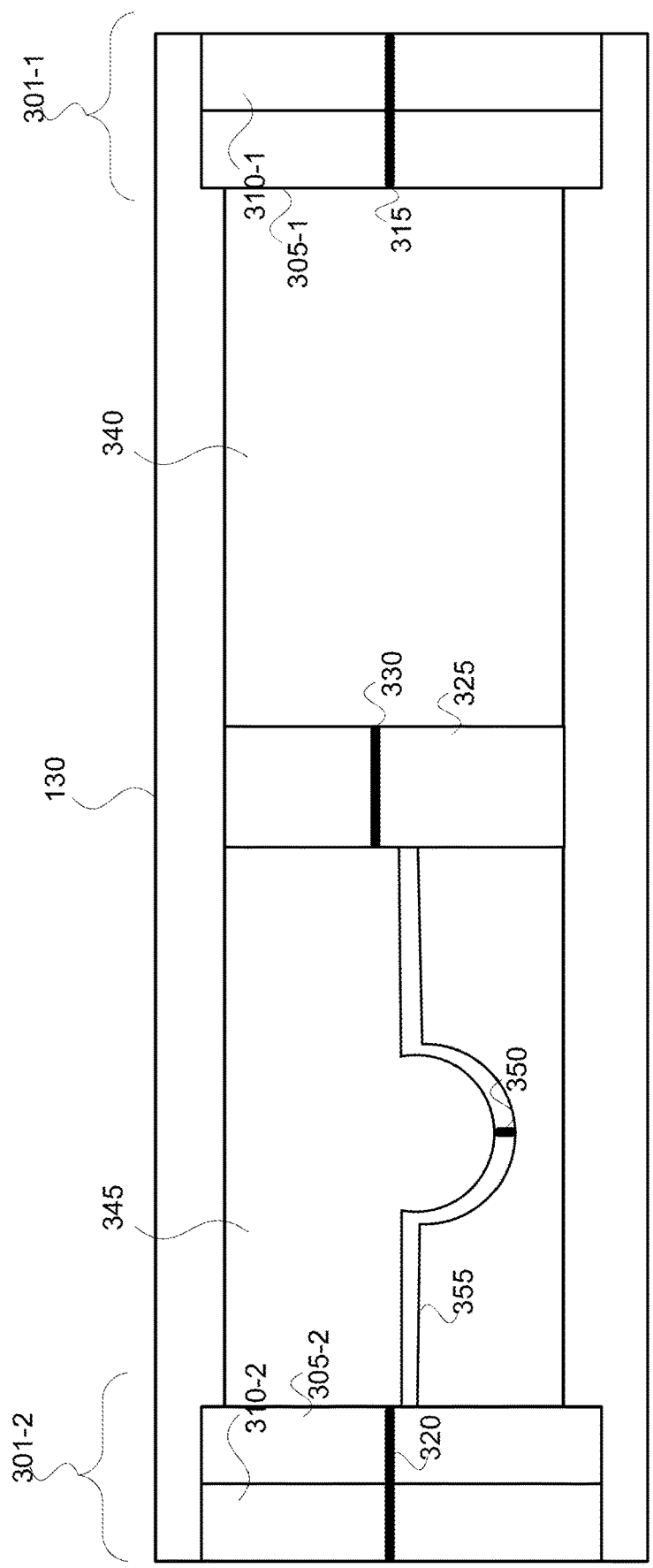
FIG. 3 illustrates the components of a collection chamber, in accordance with various first embodiments.

Referring to FIG. 3, according to a first embodiment, the collection chamber 130 may include an initial fraction chamber 340, a secondary fraction chamber 345, inlet portion 301-1, outlet portion 301-2, baffle 325 including passage 330, and baffle 355 including passage 350. The inlet portion 301-1 may include plug 305-1, cap 310-1, and inlet 315. The outlet portion 301-2 may include plug 305-2, cap 310-2, and outlet 320.

The plugs 305-1 and 305-2 (collectively referred to as "plugs 305") may be used to seal the collection chamber 130 utilizing a seal (not shown) in order to maintain the pressure inside the extraction chamber 128 and/or to prevent or reduce an amount of composition, compound, or solvent from escaping the collection chamber 130. The caps 310-1 and 310-2 (collectively referred to as "caps 310") may be placed in the collection chamber 130 to retain the plugs 305. The caps 310 and the plugs 305 may be coupled with the collection chamber 130 utilizing threads, wherein the caps 310 and the plugs 305 may include external (male) threads and the inner wall 235 may include internal (female) threads (not shown). Such threads may be tapered according to NPT standards. However, the example embodiments are not limited thereto, and in various embodiments, any type of fastener(s) may be used to couple the caps 310 and plugs 305 to the collection chamber 130. Furthermore, such threads may enable an operator of the SFE apparatus to unscrew the caps 310 and plugs 305 in order to remove the extracted compound from the collection chamber 130.

The inlet 315 may be an opening through which the composition may enter the initial fraction chamber 340 of the collection chamber 130. Fluid conveyance device nozzles may connect to the inlet 315 to enable the transfer of composition into the initial fraction chamber 340. In some embodiments, the inlet 315 may include threads, such as NPT threads, to allow such fluid conveyance device nozzles to connect thereto. The inner diameter of the inlet 315 may be chosen to reduce the pressure of the composition as the composition moves through the inlet 315. In this way, the composition may undergo a phase change from a supercritical phase to a liquid phase. This phase change may cause the compound to be separated into one or more components or "fractions." Separation of fractions from a composition typically depends on the solubility of the compound(s) at different pressures and temperatures. To provide a drop in pressure sufficient to cause a phase change, the inner diameter of the inlet 315 may be smaller than the inner diameter of the fluid conveyance device nozzles attached to the inlet 315. This is because, according to the laws of fluid dynamics (e.g., Bernoulli's principle and/or the Venturi effect), a reduction in fluid pressure and an increase in fluid velocity occurs as a fluid flows through a constricted section of pipe. The separation of a composition into various fractions during a phase change is usually referred to as "fractionation." The phase change due to the drop in pressure as the compound enters the initial fraction chamber 340 may be referred to as "initial fraction" or "initial fractionation." The initial fraction may also cause the compound to enter the liquid phase or a solid phase depending on the chemical characteristics of the compound.

By way of example, in embodiments where the solvent is liquid $CO_2$ and the compound to be extracted comprises cannabinoids, the pump 113 may be capable of moving the liquid $CO_2$ (and the composition once the liquid $CO_2$ combines with the source material inside an extraction chamber 128) through the SFE apparatus 100 at approximately 1900 psi to approximately 3800 psi (approximately 13.2 MPa to approximately 26 MPa). In such embodiments, the inner diameter of the inlet 315 may be chosen such that the pressure of the composition drops to approximately 850 psi whereby the composition should enter the liquid phase. For example, in some embodiments, the inner diameter of the inlet 315 may be between approximately 0.1 millimeters (mm) and approximately 2 mm. When the $CO_2$ enters the liquid phase, the cannabinoids may no longer be soluble in the liquid $CO_2$. Since cannabinoids are fatty acids (i.e., lipids), the cannabinoids may separate from the liquid $CO_2$ while inside the initial fraction chamber 340. In some cases, some of the cannabinoids sink to the bottom portion of the initial fraction chamber 340 while some cannabinoids may be lipid droplets suspended in the liquid $CO_2$.

In typical SFE apparatuses, a composition may undergo a pressure drop as the composition enters a collection chamber. However, in the typical SFE apparatuses, the pressure usually drops by an amount that results in the solvent entering a gaseous phase, which is then burned off and/or vented and may be condensed in a storage tank for recirculation. Furthermore, in these typical SFE apparatuses, the gaseous solvent may also be required to be vented and/or "burned off" during a decompression operation. According to various example embodiments, the composition may drop in pressure by an amount that allows the solvent to maintain the liquid phase. By maintaining the solvent in the liquid phase, the total processing time for obtaining the compound may be reduced since the time required for the solvent to enter the gaseous phase (or "burn off" from the compound) may be longer than the time required for the solvent to maintain the liquid state. Furthermore, when the solvent is recirculated into the SFE apparatus 100, the solvent may not be required to be re-condensed from a gaseous state to the liquid state in the condensing chamber 108, which may also reduce the total amount of processing time. Moreover, in many cases, maintaining the solvent in the liquid phase may reduce the amount of contaminants or impurities remaining in the collection chamber 130 since many impurities may remain in a liquid state and may flow out of the collection chamber 130 with the solvent. For instance, the inventors have discovered through experimentation that, when attempting to extract cannabinoids from a source material, typical SFE apparatuses with a vertically oriented collection chamber may yield an end product with an approximate cannabinoids concentration of 45%, whereas the SFE apparatus 100 with a horizontally oriented collection chamber 130 may yield an end product with a cannabinoids concentration of approximately 65-70%.

Referring back to FIG. 3, the baffle 325 may be any type of device that restrains, obstructs, or otherwise regulates the flow of fluid or liquid within a vessel (e.g., the collection chamber 130). In various embodiments, the baffle 325 may be used to separate the interior of the collection chamber 130 into the initial fraction chamber 340 and the secondary fraction chamber 345. The initial fraction chamber 340 may be used to hold a mixture of the solvent and one or more compounds (also referred to as "solvent/compound mixture") at a pressure that is less than the solvent's critical pressure. The solvent/compound mixture may pass through the passage 330 when the initial fraction chamber 340 is filled at least up to the height or level of the passage 330. As shown, the passage 330 is perpendicular with the baffle 325 and is in-line, level, or at a same height as the inlet 315. However, in other embodiments, the passage 330 may be above or below the inlet 330. The baffle 325 may obstruct at least some of the compound from entering the secondary fraction chamber 345 while the compound remaining in the solvent/compound mixture may enter the secondary fraction chamber 345 via passage 330. The inner diameter of the passage 330 may be chosen to allow the pressure of the solvent/compound mixture to drop as it moves through the passage 330, which may allow the remaining compound to separate from the solvent. For example, in some embodiments, the inner diameter of the passage 330 may be between approximately 100 microns and approximately 1500 microns. This second drop in pressure may be referred to as "secondary fraction." For example, in embodiments where the solvent is liquid $CO_2$ and the compound to be extracted comprises one or more cannabinoids, the initial fraction chamber 340 may hold a mixture of cannabinoids and liquid $CO_2$ (e.g., as lipid droplets suspended in the liquid $CO_2$) at a pressure of approximately 850 psi. As the cannabinoids/liquid $CO_2$ mixture passes through the passage 330, the pressure may drop from approximately 850 psi to approximately 750 psi.

The secondary fraction chamber 345 may include baffle 355. The baffle 355 may include passage 350, which may collect the compound that failed to separate from the solvent in the initial fraction chamber 340. In some embodiments, the inner diameter of the passage 350 may provide an additional drop in pressure, while in other embodiments the passage 350 may not cause an additional drop in pressure. For example, in some embodiments, the inner diameter of the passage 350 may be between approximately 0.1 mm and approximately 2 mm. As shown, the baffle 355 has a cup-like or concave shape wherein the concavity of the baffle 355 faces a top portion of the collection chamber 130, which may aid in the collection of the compound. The size and shape of the concavity may be based on one or more design choices. It should be noted that in other embodiments, the baffle 355 may include any suitable shape and/or orientation.

The outlet 320 may be an opening through which the solvent may exit the secondary fraction chamber 345 of the collection chamber 130. Fluid conveyance device nozzles may connect to the outlet 320 to enable the transfer of the solvent out of the secondary fraction chamber 345. In this regard, the outlet 320 may include threads, such as NPT threads, to allow such fluid conveyance device nozzles to connect thereto. For example, in some embodiments, the inner diameter of the outlet 320 may be between approximately 1 mm and approximately 10 mm. Once the solvent exits the collection chamber 130, the solvent may be recirculated through the SFE apparatus 100 for further compound extraction. Once the extraction process is completed and the SFE apparatus 100 undergoes a decompression operation, any excess solvent that remains in the initial fraction chamber 340 and/or the secondary fraction chamber 345 may be "burned off" or otherwise precipitated out during a decompression operation.

Furthermore, although FIG. 3 shows the baffle 325 placed substantially in the center of the collection chamber 130, the example embodiments are not limited thereto. In some embodiments, the baffle 325 may be positioned closer to outlet portion 301-2 than the inlet portion 301-1, and in some other embodiments, the baffle 325 may be positioned closer to inlet portion 301-1 than the outlet portion 301-2.

Figure 4:
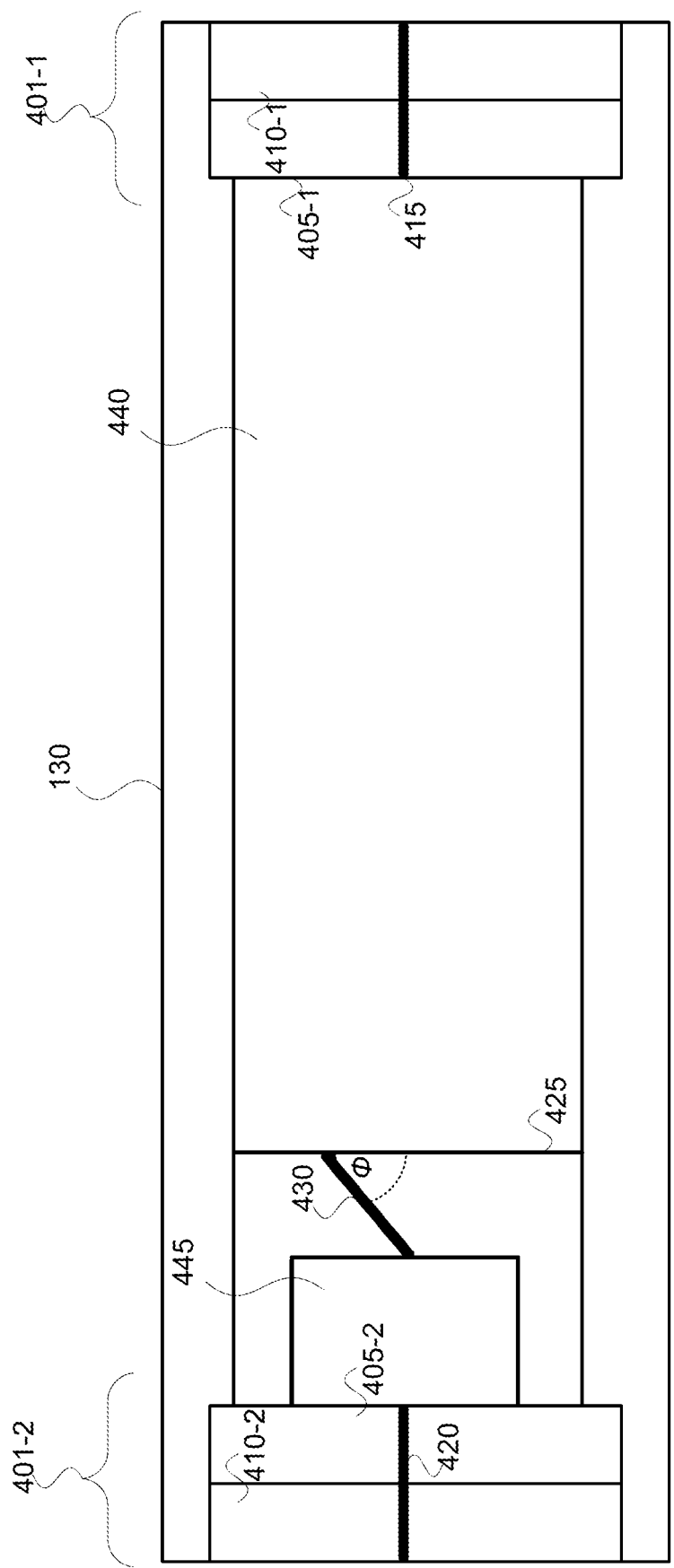
FIG. 4 illustrates the components of a collection chamber, in accordance with various second embodiments.

Referring to FIG. 4, according to a second embodiment, the collection chamber 130 may include an initial fraction chamber 440, a secondary fraction chamber 445, inlet portion 401-1, outlet portion 401-2, and baffle 425 including passage 430. The inlet portion 401-1 may include plug 405-1, cap 410-1, and inlet 415. The outlet portion 401-2 may include plug 405-2, cap 410-2, and outlet 420 (noting that plugs 405-1 and 405-2 may be collectively referred to as "plugs 405," and caps 410-1 and 410-2 may be collectively referred to as "caps 410"). The initial fraction chamber 440, secondary fraction chamber 445, plugs 405, caps 410, inlet 415, and outlet 420 may be the same or similar to the initial fraction chamber 340, secondary fraction chamber 345, plugs 305, caps 310, inlet 315, and outlet 320 described with regard to FIG. 3.

As shown by FIG. 4, the baffle 425 may have a cup-like shape wherein a concavity or opening of the cup is oriented towards the outlet portion 401-2, and the baffle 425 is adjacent to the plug 405-2. The cup-like shape of the baffle 425 may provide an area or spacing for secondary fraction to take place in the secondary fraction chamber 445. The inventors have discovered through experimentation that in various embodiments the cup-like shape of the baffle 425 and the placement of the baffle 425 closer to the outlet portion 401-2 than the inlet portion 401-1 may increase a surface area of the initial fraction chamber 440, which may increase an amount of compound that may be precipitated out of the composition during the initial fraction. Additionally, the baffle 425 includes passage 430 that is angled downwards towards the outlet 420. The passage 430 may be at an angle theta ($\theta$) with respect to a baffle wall facing the inlet portion 401-1. The passage 430 may extend from the baffle wall to the secondary fraction chamber 445. In some embodiments, the angle $\Phi$ may be an acute angle. As shown, an opening or orifice of the passage 430 which faces the inlet 415 is above the inlet 415. However, in other embodiments, the opening/orifice of the passage 430 facing the inlet 415 may be in-line, level, or at a same height as the inlet 415, or the opening/orifice of the passage 430 facing the inlet 415 may be below the height of the inlet 415. The inventors have discovered through experimentation that orienting the passage 430 at the angle $\Phi$ may aid in the reduction of pressure of the composition, which may increase an amount of compound that may be precipitated out of the composition in the secondary fraction chamber 445. Furthermore, through experimentation, the inventors have discovered that the size and/or magnitude of angle $\Phi$ may influence how much the pressure changes as the composition flows from the initial fraction chamber 440 to the secondary fraction chamber 445. By adjusting the size of angle $\Phi$, different target compounds may be obtained based on the buoyancy and pressure dependent solubility of such desired compounds. For example, a first compound may be separated out of a composition during initial fraction based on a first drop in pressure, and depending on the size of angle $\Phi$, a second compound may be separated out of the composition during secondary fraction based on a second drop in pressure. Moreover, the inner diameter of the passage 430 may also be selected to achieve a desired change in pressure. For example, in some embodiments, the inner diameter of the passage 430 may be between approximately 0.01 mm and approximately 2 mm. In various embodiments, the angle $\Phi$ may be between approximately 30 degrees and approximately 50 degrees.

Furthermore, although FIG. 4 shows the baffle 425 placed adjacent to the plug 405-2, the example embodiments are not limited thereto. In some embodiments, the baffle 425 may be placed substantially in the center of the collection chamber 130, while in other embodiments, the baffle 425 may be positioned closer to inlet portion 401-1 than the outlet portion 401-2. In some embodiments, the baffle 425 may be placed adjacent to the plug 405-1 and oriented such that the cup-like shape faces the inlet portion 401-1. Additionally, in such embodiments, the initial fraction chamber 440 may be omitted and the cup-like shape may provide a spacing that enables initial fraction. Moreover, in some embodiments, the angle $\Phi$ may be oriented such that angle $\Phi$ is an obtuse angle with respect to a baffle wall facing the inlet portion 401-1. In such embodiments, the opening/orifice of the passage 430 facing the inlet 415 may be below or lower than an opening/orifice of the passage 430 facing the outlet 420.

Figure 5:
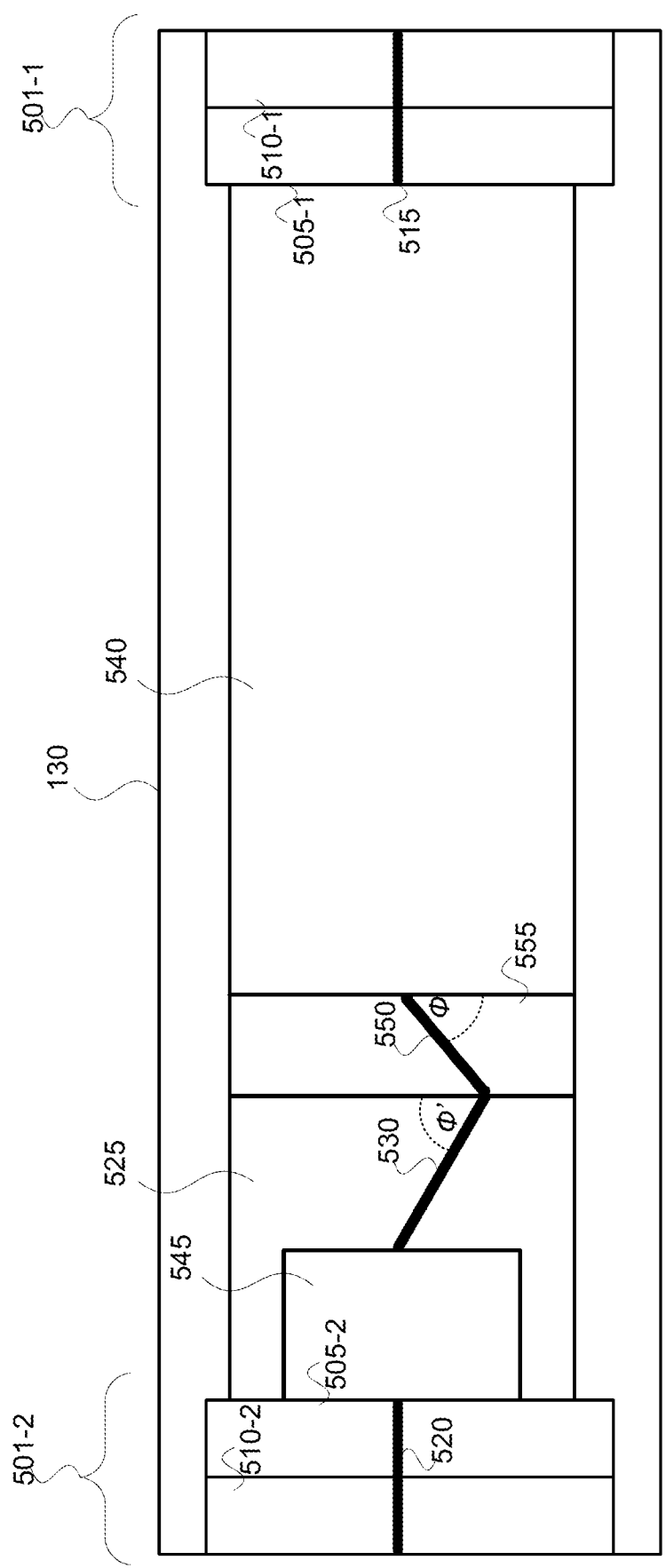
FIG. 5 illustrates the components of a collection chamber, in accordance with various third embodiments.

Referring to FIG. 5, according to a third embodiment, the collection chamber 130 may include an initial fraction chamber 540, a secondary fraction chamber 545, inlet portion 501-1, outlet portion 501-2, baffle 525 including passage 530, and baffle 555 including passage 550. The inlet portion 501-1 may include plug 505-1, cap 510-1, and inlet 515. The outlet portion 501-2 may include plug 505-2, cap 510-2, and outlet 520 (noting that plugs 505-1 and 505-2 may be collectively referred to as "plugs 505," and caps 510-1 and 510-2 may be collectively referred to as "caps 510"). The initial fraction chamber 540, secondary fraction chamber 545, plugs 505, caps 510, inlet 515, and outlet 520 may be the same or similar to the initial fraction chamber 340, secondary fraction chamber 345, plugs 305, caps 310, inlet 315, and outlet 320 described with regard to FIG. 3. Furthermore, the baffle 525 and the passage 530 may be substantially the same as the baffle 425 and the passage 430 discussed previously with regard to FIG. 4.

As shown by FIG. 5, the baffle 555 may be coupled with the baffle 525 such that an inlet portion of the passage 530 lines up with an outlet portion of the passage 550. The baffle 555 and baffle 525 may be coupled together utilizing threads, wherein the baffle 555 may include external (male) threads and the baffle 525 may include internal (female) threads (not shown).

As shown, the baffle 555 includes passage 550 that is angled downwards towards the outlet 520 and the baffle 525 includes passage 530 that is angled upwards towards the outlet 520. The passage 550 may be at an angle theta ($\theta$) with respect to a baffle wall of the baffle 525 facing the inlet portion 501-1. The passage 530 may be at an angle theta prime ($\Phi'$) with respect to a baffle wall of the baffle 525 facing the inlet portion 501-1. The passage 550 may extend from the baffle wall of the baffle 555 to an opening or orifice of the passage 530 facing the inlet portion 501-1. The passage 530 may extend from the baffle wall of the baffle 555 to the secondary fraction chamber 545. In some embodiments, the angle $\Phi$ and/or the angle $\Phi'$ may be an acute angle. As shown, an opening or orifice of the passage 550 which faces the inlet 515 is in-line, level, or at a same height as the inlet 515. However, in other embodiments, the opening/orifice of the passage 550 facing the inlet 515 may be above the inlet 515 or below the inlet 515. Additionally, as FIG. 5 shows, an opening or orifice of the passage 530 which faces the outlet 520 is in-line, level, or at a same height as the inlet 515 and the outlet 520. However, in other embodiments, the opening/orifice of the passage 530 facing the outlet 520 may be above or below the inlet 515 or outlet 520. As shown by FIG. 5, when the baffles 555 and 525 are coupled together, the passages 550 and 530 form a "V shape." However, the example embodiments are not limited thereto, and in other embodiments, the passages 550 and 530 may form any other suitable shape when the baffles 525 and 555 are coupled with one another. For example, in some embodiments, when the baffles 555 and 525 are coupled together, the passages 550 and 530 may be oriented such that the passages 550 and 530 form an "inverted V shape" or an "upside down V shape."

The inventors have discovered through experimentation that, in addition to orienting the passage 550 at the angle $\Phi$, orienting the passage 530 at the angle $\Phi'$ may further aid in the reduction of pressure of the composition. This reduction in pressure may increase an amount of compound that may be precipitated out of the composition during secondary fraction. Furthermore, through experimentation, the inventors have discovered that the size or magnitude of angle Φ and/or the size or magnitude of angle Φ' may influence how much the pressure may change as the composition flows from the initial fraction chamber 540 to the secondary fraction chamber 545. In this way, the passages can act to separate solids that have different buoyancies and pressure dependent solubility by adjusting the size of angle Φ and/or the size of angle Φ'. For example, a first compound may be separated out of a composition during initial fraction based on a first drop in pressure, and depending on the size of angle Φ and/or the size of angle Φ', a second compound may be separated out of the composition during secondary fraction based on a second drop in pressure. In various embodiments, the size of angle Φ may be between approximately 30 degrees and approximately 50 degrees and the size of angle Φ' may be between approximately 30 degrees and approximately 50 degrees. In some embodiments, Φ and Φ' may be equal, while in other embodiments, Φ and Φ' may have different values. Moreover, the inner diameters of the passages 530 and 550 may be selected to achieve a desired change in pressure. For example, in some embodiments, the inner diameter of the passages 530 may be between approximately 0.1 mm and approximately 2 mm, and/or the inner diameter of the passages 550 may be between approximately 0.1 mm and approximately 2 mm.

Although FIG. 5 shows that the baffles 525 and 555 are placed adjacent to the plug 505-2, however, the example embodiments are not limited thereto. In some embodiments, the baffles 525 and 555 may be positioned substantially in the center of the collection chamber 130, while in other embodiments the baffles 525 and 555 may be positioned closer to inlet portion 501-1 than the outlet portion 501-2. In some embodiments, the baffles 525/555 may be placed adjacent to the plug 505-1 and oriented such that the cup-like shape of baffle 525 faces the inlet portion 501-1. Additionally, in such embodiments, the initial fraction chamber 540 may be omitted and the cup-like shape may provide a spacing that enables initial fraction. Additionally, although FIG. 5 shows only two baffles 525 and 555 coupled together, the example embodiments are not limited thereto. In some embodiments, three or more baffles may be coupled together. For example, in some embodiments, the baffle 525 may be coupled with baffle 555, which may be coupled with another baffle 555 including another passage 550. In such embodiments, each of the baffles may be coupled together such that their passages form a "zig-zag shape." Furthermore, although FIG. 5 shows that the baffles 525 and 555 are coupled with one another, the example embodiments are not limited thereto. In some embodiments, the baffles 525 and 555 may be separated from one another, thereby creating an additional secondary fraction chamber therebetween.

With reference to FIGS. 1-5, a process for operating the SFE apparatus 100 may proceed as follows:

A first amount of a first source material may be placed inside the first extraction chamber (FEC) 128-1, and a second amount of a second source material may be placed inside the second extraction chamber (SEC) 128-2. The solvent may be supplied to the condensing chamber 108 from the solvent source 105. The check valve 120-1 may prevent or reduce an amount of supplied solvent from flowing back into the solvent source 105. While in the condensing chamber 108, the cooling device 110 and the coil 109 may cool the solvent to a temperature such that the solvent enters or maintains a liquid state. For example, in embodiments where the solvent is $CO_2$, the cooling device 110 and the coil 109 may cool $CO_2$ to a temperature of approximately −57° C. to 30° C. In some embodiments, the condensing chamber 108 may pressurize the $CO_2$ to a pressure of approximately 74.9 psi.

When the solvent is cooled and/or pressurized in the condensing chamber 108, the pump 113 may pump the solvent into the FEC 128-1. An air compressor of the pump 113 may pressurize the solvent to at or above a critical pressure. In some embodiments, the solvent may be pressurized based on a range of solubility for a compound to be extracted, which may be dependent on the chemical properties of the solvent and/or the compound to be extracted. For example, in embodiments where the solvent is $CO_2$ and the compound to be extracted comprises one or more cannabinoids, the $CO_2$ may be pressurized to a pressure within a desired range of solubility for dissolving a desired amount of cannabinoids in the $CO_2$. Such a desired range of solubility may be in the range of approximately 2500 psi and approximately 3400 psi, even though the critical pressure for $CO_2$ is approximately 1071 psi. This is because $CO_2$ at pressures below 2500 psi may not dissolve a desired amount of cannabinoids in the supercritical $CO_2$, which may result in a less than desired concentration of cannabinoids being collected.

Referring back to FIG. 1, the check valve 120-2 may prevent most of the solvent from flowing back into the condensing chamber 108. Prior to, concurrently with, or after the condensing chamber 108 is filled with the solvent, the control valve 125-1 may be adjusted to direct the flow of the solvent into the FEC 128-1 via an inlet 215. The pump 113 may pump the solvent into the FEC 128-1 at an achievable flow rate. When the solvent flows into the FEC 128-1, the heating element 118 may heat the FEC 128-1 such that the solvent reaches a critical temperature (or near a critical temperature). For example, in embodiments where the solvent is $CO_2$, the critical temperature may be a temperature in the range of approximately 31° C. to approximately 100° C. At this point, the solvent may enter the supercritical phase. The pressure gauge 123-1 may be used to monitor the pressure within the FEC 128-1.

The solvent in the supercritical phase may become saturated with a first compound as it moves through the FEC 128-1 and comes into contact with the first source material to form a first composition. Prior to, concurrently with, or after the solvent flows into the FEC 128-1, the control valve 125-2 may be adjusted in order to direct the flow of the first composition from the FEC 128-1 to the collection chamber 130. The first composition may then flow out of the outlet 220 of the FEC 128-1 and into an initial fraction chamber of the collection chamber 130 (e.g., initial fraction chamber 340, 440, or 540) via an inlet of the collection chamber 130 (e.g., inlet 315, 415, or 515).

As the first composition flows into an inlet of the collection chamber 130, the first composition may undergo a first drop in pressure. The first drop in pressure may cause the first composition to enter the liquid phase and thereby cause at least some of the compound to separate from the first composition. The first composition may then flow out of the initial fraction chamber into a secondary fraction chamber of the collection chamber 130 (e.g., secondary fraction chamber 345, 445, or 545) via a passage (e.g., passage 330, 430, or 530/550). As the first composition flows into the secondary fraction chamber, the first composition may undergo a second drop in pressure. The second drop in pressure may cause any remaining compound to separate from the solvent. The pressure gauge 123-3 may be used to monitor the pressure within the secondary fraction chamber, the initial fraction chamber, or an entirety of the collection chamber 130. In some embodiments, the secondary fraction chamber and the initial fraction chamber may each have their own associated pressure gauges (not shown). The solvent may then flow out of the collection chamber 130 via an outlet of the collection chamber 130 (e.g., outlet 320, 420, or 520).

Once the solvent exits the collection chamber 130, the solvent may be recirculated through the SFE apparatus 100. The check valve 120-3 may prevent or reduce an amount of recirculated solvent from flowing back into the collection chamber 130. The recirculated solvent may re-enter the FEC 128-1 via the condensing chamber 108 in a same manner as discussed previously until an entirety of the first compound is extracted from the first source material.

In various embodiments, prior to the entirety of the first composition leaving the FEC 128-1, the control valve 125-1 may be adjusted to direct the flow of recirculated solvent into the SEC 128-2. Furthermore, after an entirety of the first composition leaves the FEC 128-1, the control valve 125-2 may be adjusted to direct a flow of fluid from the SEC 128-2 to the collection chamber 130. The time at which to adjust the control valve 125-1 and the control valve 125-2 may be based on an extraction period. The extraction period may be an amount of time to extract a desired amount of compound. The extraction period may be based on a yield rate. The yield rate may be the amount of compound to be extracted for over a period of time, and is usually denoted in grams per minute. The yield rate may be based on the flow rate provided by the pump 113, an extraction yield percentage, and a desired amount of compound to be extracted.

By way of example, in embodiments where the solvent is liquid $CO_2$ and the compound to be extracted comprises cannabinoids, if the flow rate of the pump 113 is 7.3 Lpm, the extraction yield percentage is 10%, and the desired amount of cannabinoids to be extracted is 50 g, then the extraction period may be approximately 68.5 minutes depending on the change of pressure initial fraction and/or secondary fraction. The control valve 125-1 may be adjusted a few minutes before expiration of the extraction period and the control valve 125-2 may be adjusted a few minutes after expiration of the extraction period. According to the aforementioned example, the control valve 125-1 may be adjusted at approximately 58 minutes after the solvent enters an extraction chamber 128 and the control valve 125-2 may be adjusted at approximately 70 minutes after the solvent enters the extraction chamber 128.

Once an entirety of the first compound is extracted from the first source material, the recirculated solvent may enter the SEC 128-2 via the condensing chamber 108 and pump 113 in a same or similar manner as discussed previously with regard to FEC 128-1. Once inside the SEC 128-2, the recirculated solvent may enter the supercritical phase and may form a second composition as it moves through the SEC 128-2 and comes into contact with the second source material. The second composition may flow through the collection chamber 130 and the second compound may be separated from the solvent in the same manner as discussed previously. It should be noted that in most embodiments, the first source material may be a same product as the second source material, the first amount may be substantially equal to the second amount, the first compound may be the same compound as the second compound, and the first composition may be the same composition as the second composition. However, in some embodiments, the first source material could be different than the second source material. For example, the first source material and the second source material may be different plant strains/species.

Furthermore, after the first compound is extracted from the first source material, and as the solvent is recirculated through the SEC 128-2, new source material may be placed in the FEC 128-1. Prior to placing the new source material into the FEC 128-1, an end product remaining in the FEC 128-1 must be removed or evacuated from the FEC 128-1. According to various embodiments, the end product remaining in the FEC 128-1 may be evacuated using air pressure provided by an air compressor of the pump 113. Most typical SFE apparatuses require vacuum systems to evacuate an end product from an extraction chamber. These vacuum systems may damage the end product and/or contaminate the end product. Using air pressure to remove the end product from an extraction chamber 128 may better preserve the end product by controlling a container that the end product is evacuated into. The evacuated end product may then be used for other purposes, such as extracting other compounds during another extraction process in which those other compounds are targeted. Additionally, once the entirety of the second compound is extracted from the second source material, an end product remaining in the SEC 128-2 may be removed or evacuated from the SEC 128-2 in the same manner as discussed previously with regard to the FEC 128-1 and new source material may be placed in the SEC 128-2.

The extraction process may be repeated until the collection chamber 130 is filled with the target compound(s). Once the extraction process is completed, the SFE apparatus 100 may undergo a decompression operation. During the decompression operation, any excess solvent that remains in the collection chamber 130 may be "burned off" or otherwise precipitated out. In such embodiments, the ball valve 115 may be placed in an open state to allow the burned off solvent to escape the collection chamber 130. For example, in embodiments where the solvent is liquid $CO_2$, the temperature of the collection chamber 130 may be increased so that the liquid $CO_2$ may enter a gaseous phase, and the ball valve 115 may be placed in an open state to allow the gaseous $CO_2$ to escape the collection chamber 130. Once the excess solvent is burned off, the collection chamber 130 may be opened and the extracted compound may be removed according to any suitable process.

Figure 6:
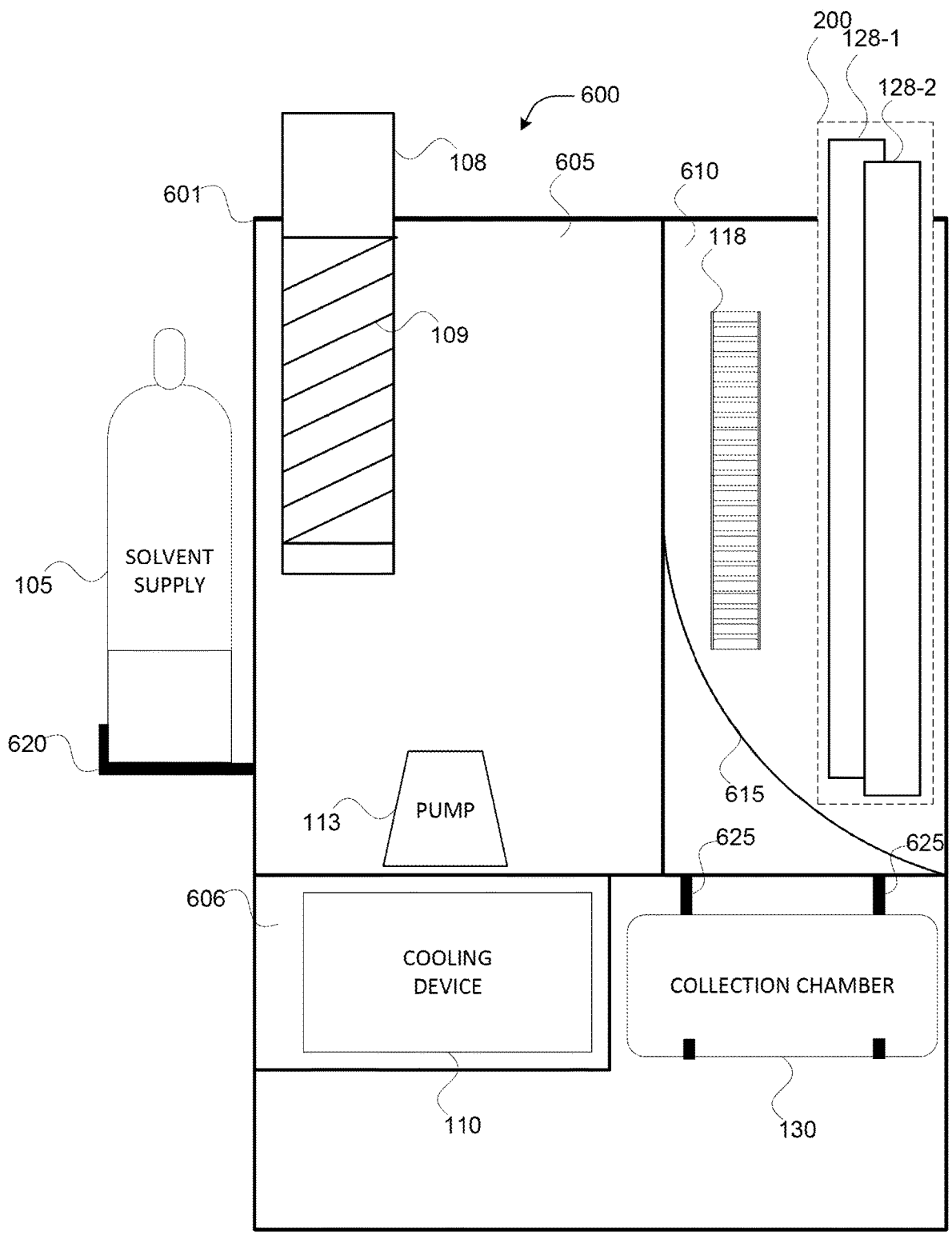
FIG. 6 illustrates an arrangement of various components of the SFE apparatus, in accordance with various embodiments.

FIG. 6 illustrates an arrangement 600 of the components of the SFE apparatus 100, in accordance with various embodiments. The arrangement 600 may include a frame 601. Frame 601 may include a cooling enclosure 605, a cooling device enclosure 606, a heating enclosure 610, a solvent supply holder 620, and a collection chamber holder 625.

The cooling enclosure 605 may contain the condensing chamber 108, coil 109, and the pump 113. The cooling device enclosure 606 may contain the cooling device 110. The heating enclosure 610 may contain the heating element 118, the extraction assembly 200 including the extraction chamber 128, and optionally the scooped bottom 615. As shown by FIG. 6, the extraction chambers 128 are placed side by side within the heating enclosure 610 and may be supplied with the solvent from the solvent source 105 utilizing the pump 113. Optionally, each of the extraction chambers 128 may detach from the extraction assembly 200 and/or the frame 601 so that an operator of the SFE apparatus 100 may place new source material into a removed extraction chamber 128. In the arrangement 600, after a compound is extracted from a source material within an extraction chamber 128, the air pressure from the pump 113 may be used to evacuate the end product remaining in the extraction chambers 128. Once discharged, the scooped bottom 615 may be used to aid in the removal of end product from the frame 601. Thereafter, the extraction chamber 128 may be removed from the frame 601 so that an operator of the SFE apparatus may add new source material to the extraction chamber 128.

The solvent supply holder 620 may be any suitable device capable of holding the solvent source 105, such as hooks, clamps, shelves, cubby-hole, and/or any other like device(s) for holding an object in a fixed position. In some embodiments, solvent supply holder 620 may include one or more magnetized materials and/or one or more adhesive materials to hold the solvent source 105 in a fixed position. The solvent supply 105 may detach from the solvent supply holder 620 and/or the frame 601 so that an operator of the SFE apparatus 100 may replace the solvent source 105. The collection chamber holder 625 may be any suitable device capable of holding the collection chamber 130, and may be the same or similar as the solvent supply holder 620. Moreover, the collection chamber 130 may detach from the collection chamber holder 625 and/or the frame 601 so that an operator of the SFE apparatus 100 may remove the extracted compound from the collection chamber 130.

As shown by FIG. 6, the collection chamber 130 is mounted substantially perpendicular to the extraction assembly 200. By mounting the collection chamber 130 substantially perpendicular to the extraction assembly 200, a surface area within the collection chamber 130 may be increased, which may increase an amount of compound that is capable of being collected within the collection chamber 130. Additionally, FIG. 6 shows that the collection chamber 130 is mounted below the extraction assembly 200 and the condensing chamber 108, which may provide a head pressure for recirculating the solvent back into the condensing chamber 108. However, the position of the collection chamber 130 relative to the other components of the SFE apparatus 100 may be altered according to one or more design choices.

Although not shown by FIG. 6, the frame 601 may also contain the ball valve 115; the check valves 120; the pressure gauges 123; the control valves 125; fluid conveyance devices; and/or any other component of the SFE apparatus 100 as shown and described herein.

While a particular arrangement is represented in FIG. 6, other suitable arrangements may be used in other embodiments in accordance with the teachings disclosed herein.

While particular components are represented in these figures, other suitable mechanical or electronic components or devices may be used in accordance with the teachings herein. For example, in some embodiments, one or more of the components of the SFE apparatus 100 may be Internet of Things (IoT) devices, which may be configured to obtain sensor data, transmit and receive messages based on the sensor data, and/or change their state and/or orientation in response to the sensor data and/or the receipt of one or more messages. For example, in embodiments where the pressure gauges 123 are IoT devices, the pressure gauges 123 may obtain pressure measurements as sensor data, and generate and transmit alert notifications or other like messages to computing devices or other IoT devices when a pressure measurement reaches a desired threshold, falls outside of a desired pressure measurement range, and the like. By way of another example, in embodiments where the control valves 125 are IoT devices, the control valves 125 may receive pressure measurement notifications from the pressure gauges 123 and/or messages from one or more computing devices, and change their state in response to receipt of the pressure measurement notifications and/or other messages.

Some non-limiting examples are provided below.

Example 1 may include an extraction assembly of a supercritical fluid extraction (SFE) apparatus, the extraction assembly comprising: a first extraction chamber (FEC) to contain a first amount of a first source material from which a first compound is to be extracted; a second extraction chamber (SEC) to contain a second amount of a second source material from which a second compound is to be extracted; and a valve to control a flow of a solvent into the FEC or the SEC, wherein, when the solvent is to flow into the FEC, the solvent is to enter a supercritical phase to obtain, from the first source material, a first composition comprising the solvent and the first compound, and wherein, after the solvent is to flow into the FEC, the solvent is to be recirculated into the SEC, and when the solvent is to flow into the SEC, the solvent is to enter a supercritical phase to obtain, from the second source material, a second composition comprising the solvent and the second compound.

Example 2 may include the extraction assembly of example 1 and/or any other one or more examples disclosed herein, wherein the solvent is to be recirculated into the SEC without the SFE apparatus undergoing a decompression operation.

Example 3 may include the extraction assembly of claim 1 and/or any other one or more examples disclosed herein, wherein new first source material is to be placed inside the FEC as the solvent is recirculated into the SEC and without the SFE apparatus undergoing a decompression operation.

Example 4 may include the extraction assembly of claim 3 and/or any other one or more examples disclosed herein, wherein after the new first source material is placed inside the FEC, and after the solvent is recirculated into the SEC, the solvent is recirculated into the FEC and without the SFE apparatus undergoing a decompression operation.

Example 4.5 may include the extraction assembly of claim 1 and/or any other one or more examples disclosed herein, wherein each of the FEC and the SEC are detachable from the extraction assembly.

Example 5 may include the extraction assembly of example 1 and/or any other one or more examples disclosed herein, wherein a volume of the FEC and a volume of the SEC are selected based on an extraction yield percentage, wherein the extraction yield percentage is a ratio of a desired amount of compound to be extracted to an amount of source material required to obtain the desired amount of compound.

Example 5.5 may include the extraction assembly of example 1 and/or any other one or more examples disclosed herein, wherein a volume of the FEC and a volume of the SEC are between 1 liter (L) and 3 L, and wherein the volume of the FEC is a same volume as the volume of the SEC or the volume of the FEC is a different volume as the volume of the SEC.

Example 6 may include the extraction assembly of example 5 and/or any other one or more examples disclosed herein, wherein the valve is to direct the flow of the solvent into the SEC before an entirety of the first composition is to leave the FEC, and a time at which the valve is to direct the flow of the solvent into the SEC is based on a desired extraction period, wherein the desired extraction period is based on a yield rate, and the yield rate is based on a desired flow rate, the extraction yield percentage, and the desired amount of compound to be extracted.

Example 6.5 may include the extraction assembly of example 6 and/or any other one or more examples disclosed herein, wherein after the solvent is to be recirculated into the SEC, the FEC is to be detached from the extraction assembly.

Example 7 may include the extraction assembly of example 1 and/or any other one or more examples disclosed herein, wherein the SFE apparatus comprises a pump to move the solvent into the FEC or the SEC based on a state of the valve, wherein the pump comprises an air compressor, and wherein a first end product is to remain in the FEC when the compound is extracted from the first amount of the first source material, and the first end product is to be evacuated from the FEC using air pressure from the air compressor of the pump, and a second end product is to remain in the SEC when the second compound is extracted from the second amount of the second source material, and the second end product is to be evacuated from the SEC using the air pressure from the air compressor of the pump.

Example 7.5 may include the extraction assembly of example 1 and/or any other one or more examples disclosed herein, wherein the first source material is a same material as the second source material or the first source material is different than the second source material; and the first amount is a same amount as the second amount or the first amount is different than the second amount.

Example 8 may include a collection chamber to be implemented in a supercritical fluid extraction (SFE) apparatus, the collection chamber comprising: an inlet portion including an inlet through which a composition in a supercritical phase is to enter the collection chamber; an outlet portion including an outlet through which a solvent in a liquid phase is to exit a secondary fraction chamber; and a baffle between the inlet portion and the outlet portion to separate an interior of the collection chamber into an initial fraction chamber and a secondary fraction chamber, the baffle including an outlet baffle wall facing the outlet portion and a baffle passage extending from an inlet baffle wall facing the inlet portion to the secondary fraction chamber, wherein the composition in the supercritical phase comprises a solvent and a compound to be extracted from a source material, and wherein, as the composition flows through the inlet into the initial fraction chamber, the composition changes from the supercritical phase to the liquid phase such that at least some of the compound separates from the solvent, and a mixture including the solvent in the liquid phase and a remaining amount of the compound is to enter the secondary fraction chamber via the passage, and as the mixture flows through the passage, the mixture is to drop in pressure such that the remaining amount the compound is to separate from the solvent.

Example 9 may include the collection chamber of example 8 and/or any other one or more examples disclosed herein, wherein an inner diameter of the inlet is smaller than an inner diameter of a fluid conveyance device attached to the inlet portion such that, as the composition flows through the inlet, a pressure of the composition is reduced by an amount that is between approximately 1000 pounds per square inch (psi) and approximately 3000 psi, and an inner diameter of the passage is selected such that, as the mixture flows through the passage, a pressure of the solvent drops by at least 100 psi.

Example 10 may include the collection chamber of example 8 and/or any other one or more examples disclosed herein, wherein the baffle is positioned closer to the outlet portion than the inlet portion.

Example 10.5 may include the collection chamber of example 8, wherein the baffle is positioned closer to the inlet portion than the outlet portion.

Example 11 may include the collection chamber of example 8 and/or any other one or more examples disclosed herein, wherein the outlet baffle wall includes a concavity that faces the outlet portion.

Example 11.5 may include the collection chamber of example 8 and/or any other one or more examples disclosed herein, wherein the inlet baffle wall includes a concavity that faces the inlet portion.

Example 11.7 may include the collection chamber of example 11.5 and/or any other one or more examples disclosed herein, wherein the baffle is adjacent to the inlet portion.

Example 11.9 may include the collection chamber of example 11 and/or any other one or more examples disclosed herein, wherein the baffle is position substantially in the center of the collection chamber.

Example 12 may include the collection chamber of example 8 and/or any other one or more examples disclosed herein, wherein the passage is substantially perpendicular with respect to the outlet baffle wall and an opening of the passage is level with the inlet.

Example 12.5 may include the collection chamber of example 8, wherein the passage is substantially perpendicular with respect to the outlet baffle wall and an opening of the passage is above the inlet.

Example 12.6 may include the collection chamber of example 8 and/or any other one or more examples disclosed herein, wherein the passage is substantially perpendicular with respect to the outlet baffle wall and an opening of the passage is below the inlet.

Example 13 may include the collection chamber of example 8 and/or any other one or more examples disclosed herein, wherein the passage is oriented at an acute angle with respect to the inlet baffle wall or the with respect to the outlet baffle wall.

Example 13.3 may include the collection chamber of example 13 and/or any other one or more examples disclosed herein, wherein the acute angle is between 30 degrees and 50 degrees.

Example 13.5 may include the collection chamber of any of examples 8, 13, or 13.3 and/or any other one or more examples disclosed herein, wherein the acute angle slopes downward towards the secondary fraction chamber such that an orifice of the passage facing the inlet is above an orifice of the passage facing the outlet.

Example 13.6 may include the collection chamber of any of examples 8, 13, 13.3, or 13.5 and/or any other one or more examples disclosed herein, wherein the acute angle slopes upward towards the secondary fraction chamber such that an orifice of the passage facing the inlet is below an orifice of the passage facing the outlet.

Example 14 may include the collection chamber of example 8 and/or any other one or more examples disclosed herein, wherein the baffle is a first baffle, the passage is a first passage, and the outlet baffle wall is a first outlet baffle wall, and wherein the collection chamber further comprises a second baffle including a second passage and a second inlet baffle wall facing the inlet.

Example 15 may include the collection chamber of example 14 and/or any other one or more examples disclosed herein, wherein the second baffle is substantially perpendicular to the first baffle and the second passage is substantially perpendicular to the first passage, and wherein the remaining amount of the compound is to flow through the second passage.

Example 16 may include the collection chamber of example 14 and/or any other one or more examples disclosed herein, wherein the second baffle is coupled to the first baffle such that an opening of the second passage lines up with an opening of the first passage.

Example 17 may include the collection chamber of example 16 and/or any other one or more examples disclosed herein, wherein the first passage is oriented at a first non-perpendicular angle with respect to the first inlet baffle wall such that an orifice of the first passage which faces the inlet is above the inlet and an orifice of the first passage which faces the outlet is below the inlet, the second passage is oriented at a second non-perpendicular angle with respect to a second inlet baffle wall of the second baffle such that an orifice of the second passage which faces the inlet is below the inlet and an orifice of the second passage which faces the outlet is above the inlet.

Example 17.3 may include the collection chamber of example 17 and/or any other one or more examples disclosed herein, wherein, when the first baffle is coupled with the second baffle, the first passage and the second passage form a V shape.

Example 17.5 may include the collection chamber of example 17 and/or any other one or more examples disclosed herein, wherein the first non-perpendicular angle is between 30 degrees and 50 degrees and wherein the second non-perpendicular angle is between 30 degrees and 50 degrees.

Example 17.6 may include the collection chamber of example 17.5 and/or any other one or more examples disclosed herein, wherein the first non-perpendicular angle has a same magnitude as the second non-perpendicular angle, or the first non-perpendicular angle does not have the same magnitude as the second non-perpendicular angle.

Example 17.7 may include the collection chamber of example 18 and/or any other one or more examples disclosed herein, wherein the first passage slopes downward towards the secondary fraction chamber such that an orifice of the first passage facing the inlet is above an orifice of the first passage facing the outlet, and the second passage angle slopes upward towards the secondary fraction chamber such that an orifice of the second passage facing the inlet is below an orifice of the second passage facing the outlet.

Example 17.8 may include the collection chamber of example 17 and/or any other one or more examples disclosed herein, wherein the first passage slopes upward towards the secondary fraction chamber such that an orifice of the first passage facing the inlet is below an orifice of the first passage facing the outlet, and the second passage slopes downward towards the secondary fraction chamber such that an orifice of the second passage facing the inlet is above an orifice of the second passage facing the outlet.

Example 17.9 may include the collection chamber of example 17 and/or any other one or more examples disclosed herein, wherein the collection chamber further comprises a third baffle including a third passage that is coupled with the second baffle, wherein the third passage is oriented at a third non-perpendicular angle with respect to a third inlet baffle wall such that an orifice of the third passage which faces the inlet is above the inlet and an orifice of the first passage which faces the outlet is below the inlet, the second passage is oriented at a second non-perpendicular angle with respect to a second inlet baffle wall of the second baffle such that an orifice of the second passage which faces the inlet is below the inlet and an orifice of the second passage which faces the outlet is above the inlet.

Example 18 may include the collection chamber of example 17 and/or any other one or more examples disclosed herein, wherein an outlet baffle wall of the first baffle is adjacent to the outlet portion and the orifice of the second passage facing the outlet is at a same height as the outlet.

Example 18.1 may include the collection chamber of example 18 and/or any other one or more examples disclosed herein, wherein the outlet baffle wall of the first baffle includes a concavity that faces the outlet portion and a spacing created by the concavity forms the secondary fraction chamber.

Example 18 may include the collection chamber of example 17 and/or any other one or more examples disclosed herein, wherein an outlet baffle wall of the second baffle is adjacent to the outlet portion such that the orifice of the second passage facing the outlet is lined up with the outlet.

Example 18.5 may include the collection chamber of example 18 and/or any other one or more examples disclosed herein, wherein, during operation of the SFE apparatus, the solvent is not to enter a gaseous phase.

Example 19 may include a supercritical fluid extraction (SFE) apparatus comprising: a frame to enclose an extraction assembly and a collection chamber, wherein the collection chamber is mounted substantially perpendicular to the extraction subassembly, wherein the extraction assembly comprises: a first extraction chamber (FEC) to contain a first amount of a first source material from which a first compound is to be extracted; a second extraction chamber (SEC) to contain a second amount of a second source material from which a second compound is to be extracted; and a valve to control a flow of a solvent into the FEC or the SEC, wherein the solvent is to flow into the FEC and enter a supercritical phase to obtain, from the first source material, a first composition comprising the solvent and the first compound; and wherein the collection chamber comprises: an inlet portion including an inlet through which the first composition is to enter the collection chamber and undergo a phase change such that the first compound separates from the solvent; and an outlet portion including an outlet through which the solvent in a liquid phase is to exit the collection chamber for recirculation into the SEC; wherein, after the solvent exits the collection chamber and is recirculated into the SEC, the solvent is to enter the supercritical phase to obtain, from the second source material, a second composition comprising the solvent and the second compound, and wherein the second composition is to flow into the inlet portion of the collection chamber and undergo the phase change such that the second compound separates from the solvent, and after the solvent exits the collection chamber, the solvent is to be recirculated into the FEC.

Example 20 may include the SFE apparatus of example 20 and/or any other one or more examples disclosed herein, wherein the collection chamber is detachable from the frame.

Example 21 may include the SFE apparatus of example 20 and/or any other one or more examples disclosed herein, wherein the collection chamber is the collection chamber of any of examples 9-19 and/or the extraction assembly is the extraction assembly of any of examples 1-8.5.

Example 22 may include the SFE apparatus of any one of examples 20-21 and/or any other one or more examples disclosed herein, wherein SFE apparatus is operated in a steady-state fashion.

Example 23 may include a method of operating a supercritical fluid extraction (SFE) apparatus of any one of examples 1-22 and/or as otherwise described herein.

Example 24 may include a multi-fraction collection chamber to be implemented in a supercritical fluid extraction (SFE) apparatus, the collection chamber comprising: an inlet portion including an inlet passage through which a composition in a supercritical phase is to enter an initial fraction chamber of the collection chamber and drop in pressure by a first amount such that at least some compound of the composition separates from a solvent of the composition and remains in the initial fraction chamber; a baffle between the inlet portion and an outlet portion to separate an interior of the collection chamber into the initial fraction chamber and a secondary fraction chamber, the baffle including an outlet baffle wall facing the outlet portion, an inlet baffle wall facing the inlet portion, and a baffle passage extending from the inlet baffle wall to the outlet baffle wall through which a mixture including the solvent and additional compound is to enter the secondary fraction chamber and drop in pressure by a second amount such that the additional compound separates from the solvent and remains in the secondary fraction chamber; and the outlet portion including an outlet passage through which solvent in a liquid phase is to exit a secondary fraction chamber.

Example 25 may include the collection chamber of example 24 and/or any other one or more examples disclosed herein, wherein an inner diameter of the inlet passage is smaller than an inner diameter of a fluid conveyance device attached to the inlet portion such that, as the composition flows through the inlet passage, a pressure of the composition is reduced by the first amount, and the first amount being between approximately 1000 pounds per square inch (psi) and approximately 3000 psi, and an inner diameter of the baffle passage is selected such that, as the mixture flows through the baffle passage, a pressure of the mixture drops by at least 100 psi.

Example 26 may include the collection chamber of example 24 and/or any other one or more examples disclosed herein, wherein the baffle is positioned closer to the outlet portion than the inlet portion.

Example 27 may include the collection chamber of example 24 and/or any other one or more examples disclosed herein, wherein the outlet baffle wall includes a concavity that faces the outlet portion.

Example 28 may include the collection chamber of example 24 and/or any other one or more examples disclosed herein, wherein the baffle passage is substantially perpendicular with respect to the inlet baffle wall and an opening of the baffle passage is level with the inlet.

Example 29 may include the collection chamber of example 24 and/or any other one or more examples disclosed herein, wherein the baffle passage is oriented at an acute angle with respect to the inlet baffle wall, and the acute angle is between approximately 30 degrees and approximately 50 degrees.

Example 30 may include the collection chamber of example 24 and/or any other one or more examples disclosed herein, wherein the baffle is a first baffle, the baffle passage is a first baffle passage, and the inlet baffle wall is a first inlet baffle wall, and wherein the collection chamber further comprises a second baffle including a second baffle passage and a second inlet baffle wall facing the inlet portion.

Example 31 may include the collection chamber of example 30 and/or any other one or more examples disclosed herein, wherein the second baffle is substantially perpendicular to the first baffle and the second baffle passage is substantially perpendicular to the first baffle passage, and wherein the mixture is to flow through the first baffle passage and the second baffle passage.

Example 32 may include the collection chamber of example 30 and/or any other one or more examples disclosed herein, wherein the second baffle is coupled to the first baffle such that an opening of the second baffle passage lines up with an opening of the first baffle passage.

Example 33 may include the collection chamber of example 32 and/or any other one or more examples disclosed herein, wherein the first baffle passage is oriented at a first angle with respect to the first inlet baffle wall such that an orifice of the first baffle passage which faces the inlet portion is above the inlet passage and an orifice of the first baffle passage which faces the outlet portion is below the inlet passage, the second baffle passage is oriented at a second angle with respect to the second inlet baffle wall such that an orifice of the second baffle passage which faces the inlet portion is below the inlet passage and an orifice of the second baffle passage which faces the outlet portion is above the inlet passage.

Example 34 may include the collection chamber of example 33 and/or any other one or more examples disclosed herein, wherein an outlet baffle wall of the first baffle is adjacent to the outlet portion and the orifice of the second baffle passage facing the outlet portion is at a same height as the outlet passage.

Example 35 may include a supercritical fluid extraction (SFE) apparatus comprising: a frame to enclose an extraction assembly and a collection chamber, wherein the collection chamber is mounted substantially perpendicular to the extraction subassembly, wherein the extraction assembly comprises: a first extraction chamber (FEC) to contain a first amount of a first source material from which a first compound is to be extracted; a second extraction chamber (SEC) to contain a second amount of a second source material from which a second compound is to be extracted; and a valve to control a flow of a solvent into the FEC or the SEC, wherein the solvent is to flow into the FEC and enter a supercritical phase to obtain, from the first source material, a first composition comprising the solvent and the first compound; and wherein the collection chamber comprises: an inlet portion including an inlet passage through which the first composition, after exiting the FEC, is to enter an initial fraction chamber of the collection chamber and drop in pressure by a first amount to undergo a phase change such that at least some of the first compound separates from the solvent and remains in the initial fraction chamber; a baffle separating an interior of the collection chamber into the initial fraction chamber and a secondary fraction chamber, the baffle including an outlet baffle wall facing the outlet portion, an inlet baffle wall facing the inlet portion, and a baffle passage extending from the inlet baffle wall to the outlet baffle wall through which a mixture including the solvent and additional first compound is to enter the secondary fraction chamber and drop in pressure by a second amount such that the additional first compound separates from the solvent and remains in the secondary fraction chamber, the additional first compound being some of the first compound that did not separate from the solvent and remain in the initial fraction chamber, and the outlet portion including an outlet passage through which the solvent in a liquid phase is to exit the collection chamber for recirculation into the SEC; and wherein, after the solvent exits the outlet portion of the collection chamber and is recirculated into the SEC, the solvent is to enter the supercritical phase to obtain, from the second source material, a second composition comprising the solvent and the second compound, wherein the second composition is to flow into the initial fraction chamber of the collection chamber via the inlet portion and undergo a phase change from the supercritical phase to the liquid phase such that at least some of the second compound separates from the solvent, and a mixture including the solvent in the liquid phase and a remaining amount of the second compound is to enter the secondary fraction chamber via the baffle passage, and as the mixture flows through the baffle passage, the mixture is to drop in pressure such that the remaining amount the second compound is to separate from the solvent, and after the solvent exits the collection chamber via the outlet portion, the solvent is to be recirculated into the FEC.

Example 36 may include the SFE apparatus of example 35 and/or any other one or more examples disclosed herein, wherein the collection chamber is detachable from the frame.

Example 37 may include the SFE apparatus of example 35 and/or any other one or more examples disclosed herein, wherein the baffle passage of the collection chamber is oriented at an acute angle with respect to the inlet baffle wall, and the acute angle is between approximately 30 degrees and approximately 50 degrees.

Example 38 may include the SFE apparatus of example 35 and/or any other one or more examples disclosed herein, wherein the baffle of the collection chamber is a first baffle, the baffle passage is a first baffle passage, and the inlet baffle wall is a first inlet baffle wall, and wherein the collection chamber further comprises a second baffle including a second baffle passage and a second inlet baffle wall facing the inlet portion.

Example 39 may include the SFE apparatus of example 38 and/or any other one or more examples disclosed herein, wherein the second baffle is coupled to the first baffle such that an opening of the second baffle passage lines up with an opening of the first baffle passage.

Example 40 may include the SFE apparatus of example 39 and/or any other one or more examples disclosed herein, wherein the first baffle passage is oriented at a first angle with respect to the first inlet baffle wall, and the second baffle passage is oriented at a second angle with respect to the second inlet baffle wall, wherein the first angle or the second angle is between approximately 30 degrees and approximately 50 degrees.

Example 41 may include the SFE apparatus of example 38 and/or any other one or more examples disclosed herein, wherein an outlet baffle wall of the first baffle is adjacent to the outlet portion and the orifice of the second baffle passage facing the outlet portion is at a same height as the outlet passage.

Example 42 may include the SFE apparatus of example 35 and/or any other one or more examples disclosed herein, wherein the baffle is a first baffle, the baffle passage is a first baffle passage, and the inlet baffle wall is a first inlet baffle wall, and the collection chamber further comprises: one or more second baffles, wherein: each of the one or more second baffles including a second baffle passage and a second inlet baffle wall facing the inlet portion, each of the one or more second baffles are not coupled to the first baffle or other ones of the one or more second baffles, a region between the first baffle and a first second baffle of the one or more second baffles is the secondary fraction chamber, and additional regions between each of the one or more second baffles except the first second baffle separates the interior of the collection chamber into additional secondary fraction chambers.

Example 43 may include the SFE apparatus of example 35 and/or any other one or more examples disclosed herein, wherein the baffle is a first baffle, the baffle passage is a first baffle passage, and the inlet baffle wall is a first inlet baffle wall, and the collection chamber further comprises: one or more second baffles, wherein: each of the one or more second baffles including a second baffle passage and a second inlet baffle wall facing the inlet portion, each of the one or more second baffles are not coupled to the first baffle or other ones of the one or more second baffles, a region between the first baffle and a first second baffle of the one or more second baffles is the secondary fraction chamber, and additional regions between each of the one or more second baffles except the first second baffle separates the interior of the collection chamber into additional secondary fraction chambers.

Example 44 may include a method of operating a supercritical fluid extraction (SFE) apparatus of any one of examples 1-43.

Although certain embodiments have been illustrated and described herein, it will be appreciated by those of ordinary skill in the art that a wide variety of alternate and/or equivalent embodiments or implementations to achieve the same or similar purposes may be substituted for the embodiments shown and described without departing from the scope of the present disclosure. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:

1. A supercritical fluid extraction (SFE) apparatus, comprising:
   an extraction assembly comprising:
      a first extraction chamber (FEC) to contain a first amount of a first source material from which a first compound is to be extracted;
      a second extraction chamber (SEC) to contain a second amount of a second source material from which a second compound is to be extracted, and
      a valve to control a flow of a solvent into the FEC or the SEC,
      wherein the solvent is to flow into the FEC and enter a supercritical phase to obtain a first composition from the first source material, the first composition comprising the solvent and the first compound, and
      wherein, after the solvent is to flow into the FEC, the solvent is to be recirculated into the SEC, and when the solvent is to flow into the SEC, the solvent is to enter the supercritical phase to obtain a second composition from the second source material, the second composition comprising the solvent and the second compound; and
   a multi-fraction collection chamber comprising:
      an inlet portion including an inlet passage through which the first composition or the second composition in the supercritical phase is to enter an initial fraction chamber of the collection chamber and drop in pressure by a first amount such that at least some first or second compound of the first or second composition separates from the solvent of the composition and remains in the initial fraction chamber;
      a baffle between the inlet portion and an outlet portion to separate an interior of the multi-fraction collection chamber into the initial fraction chamber and a secondary fraction chamber, the baffle including an outlet baffle wall facing the outlet portion, an inlet baffle wall facing the inlet portion, and a baffle passage extending from the inlet baffle wall to the outlet baffle wall through which a mixture including the solvent and additional first or second compound is to enter the secondary fraction chamber and drop in pressure by a second amount such that the additional first or second compound separates from the solvent and remains in the secondary fraction chamber; and the outlet portion including an outlet passage through which the solvent in a liquid phase is to exit the secondary fraction chamber, wherein the baffle is positioned closer to the outlet portion than the inlet portion, the baffle is positioned closer to the inlet portion than the outlet portion, or the baffle is equidistantly positioned between the outlet portion and the inlet portion.

2. The SFE apparatus of claim 1, wherein an inner diameter of the inlet passage is smaller than an inner diameter of a fluid conveyance device attached to the inlet portion such that, as the composition flows through the inlet passage, a pressure of the composition is reduced by the first amount, and the first amount being between approximately 1000 pounds per square inch (psi) and approximately 3000 psi, and an inner diameter of the baffle passage is selected such that, as the mixture flows through the baffle passage, a pressure of the mixture drops by at least 100 psi.

3. The SFE apparatus of claim 1, wherein the baffle is a first baffle, the baffle passage is a first baffle passage, and the inlet baffle wall is a first inlet baffle wall, and wherein the collection chamber further comprises:

a second baffle including a second baffle passage and a second inlet baffle wall facing the inlet portion, wherein:

the second baffle is substantially perpendicular to the first baffle and the second baffle passage is substantially perpendicular to the first baffle passage, and wherein the mixture is to flow through the first baffle passage and the second baffle passage, the second baffle is coupled to the first baffle such that an opening of the second baffle passage lines up with an opening of the first baffle passage, the first baffle passage is oriented at a first angle with respect to the first inlet baffle wall such that an orifice of the first baffle passage which faces the inlet portion is above the inlet passage and an orifice of the first baffle passage which faces the outlet portion is below the inlet passage, the second baffle passage is oriented at a second angle with respect to the second inlet baffle wall such that an orifice of the second baffle passage which faces the inlet portion is below the inlet passage and an orifice of the second baffle passage which faces the outlet portion is above the inlet passage, and/or an outlet baffle wall of the first baffle is adjacent to the outlet portion and the orifice of the second baffle passage facing the outlet portion is at a same height as the outlet passage.

4. The SFE apparatus of claim 1, wherein the outlet baffle wall includes a concavity that faces the outlet portion.

5. The SFE apparatus of claim 1, wherein the baffle passage is substantially perpendicular with respect to the inlet baffle wall and an opening of the baffle passage is level with the inlet.

6. The SFE apparatus of claim 1, wherein the baffle passage is oriented at an acute angle with respect to the inlet baffle wall, and the acute angle is between approximately 30 degrees and approximately 50 degrees.

7. The SFE apparatus of claim 1, wherein the baffle is a first baffle, the baffle passage is a first baffle passage, and the inlet baffle wall is a first inlet baffle wall, and the collection chamber further comprises:

one or more second baffles, wherein:

each of the one or more second baffles includes a second baffle passage and a second inlet baffle wall facing the inlet portion, each of the one or more second baffles are not coupled to the first baffle or other ones of the one or more second baffles, a region between the first baffle and a first second baffle of the one or more second baffles is the secondary fraction chamber, and additional regions between each of the one or more second baffles except the first second baffle separates the interior of the collection chamber into additional secondary fraction chambers.

8. A supercritical fluid extraction (SFE) apparatus, comprising:

an extraction assembly comprising:

a first extraction chamber (FEC) to contain a first amount of a first source material from which a first compound is to be extracted;

a second extraction chamber (SEC) to contain a second amount of a second source material from which a second compound is to be extracted, and a valve to control a flow of a solvent into the FEC or the SEC, wherein the solvent is to flow into the FEC and enter a supercritical phase to obtain a first composition from the first source material, the first composition comprising the solvent and the first compound, and wherein, after the solvent is to flow into the FEC, the solvent is to be recirculated into the SEC, and when the solvent is to flow into the SEC, the solvent is to enter the supercritical phase to obtain a second composition from the second source material, the second composition comprising the solvent and the second compound; and a multi-fraction collection chamber comprising:

an inlet portion including an inlet passage through which the first composition or the second composition in the supercritical phase is to enter an initial fraction chamber of the collection chamber and drop in pressure by a first amount such that at least some first or second compound of the first or second composition separates from the solvent of the composition and remains in the initial fraction chamber;

a first baffle between the inlet portion and an outlet portion to separate an interior of the multi-fraction collection chamber into the initial fraction chamber and a secondary fraction chamber, the baffle including an outlet baffle wall facing the outlet portion, a first inlet baffle wall facing the inlet portion, and a first baffle passage extending from the first inlet baffle wall to the outlet baffle wall through which a mixture including the solvent and additional first or second compound is to enter the secondary fraction chamber and drop in pressure by a second amount such that the additional first or second compound separates from the solvent and remains in the secondary fraction chamber;

a second baffle including a second baffle passage and a second inlet baffle wall facing the inlet portion; and the outlet portion including an outlet passage through which the solvent in a liquid phase is to exit the secondary fraction chamber.

9. The SFE apparatus of claim 8, wherein the second baffle is substantially perpendicular to the first baffle and the second baffle passage is substantially perpendicular to the first baffle passage, and wherein the mixture is to flow through the first baffle passage and the second baffle passage.

10. The SFE apparatus of claim 9, wherein the second baffle is coupled to the first baffle such that an opening of the second baffle passage lines up with an opening of the first baffle passage.

11. The SFE apparatus of claim 10, wherein
the first baffle passage is oriented at a first angle with respect to the first inlet baffle wall such that an orifice of the first baffle passage which faces the inlet portion is above the inlet passage and an orifice of the first baffle passage which faces the outlet portion is below the inlet passage,
the second baffle passage is oriented at a second angle with respect to the second inlet baffle wall such that an orifice of the second baffle passage which faces the inlet portion is below the inlet passage and an orifice of the second baffle passage which faces the outlet portion is above the inlet passage.

12. The SFE apparatus of claim 11, wherein an outlet baffle wall of the first baffle is adjacent to the outlet portion and the orifice of the second baffle passage facing the outlet portion is at a same height as the outlet passage.

13. A supercritical fluid extraction (SFE) apparatus comprising:
a frame to enclose an extraction assembly and a collection chamber, wherein the collection chamber is oriented to not be substantially perpendicular with respect to an orientation of the extraction assembly, and wherein:
the extraction assembly comprises:
a first extraction chamber (FEC) to contain a first amount of a first source material from which a first compound is to be extracted;
a second extraction chamber (SEC) to contain a second amount of a second source material from which a second compound is to be extracted; and
a valve to control a flow of a solvent into the FEC or the SEC,
wherein the solvent is to flow into the FEC and enter a supercritical phase to obtain, from the first source material, a first composition comprising the solvent and the first compound; and
the collection chamber comprises:
an inlet portion including an inlet passage through which the first composition, after exiting the FEC, is to enter an initial fraction chamber of the collection chamber and drop in pressure by a first amount to undergo a phase change such that at least some of the first compound separates from the solvent and remains in the initial fraction chamber;
a baffle separating an interior of the collection chamber into the initial fraction chamber and a secondary fraction chamber, the baffle including an outlet baffle wall facing an outlet portion, an inlet baffle wall facing the inlet portion, and a baffle passage extending from the inlet baffle wall to the outlet baffle wall through which a mixture including the solvent and additional first compound is to enter the secondary fraction chamber and drop in pressure by a second amount such that the additional first compound separates from the solvent and remains in the secondary fraction chamber, the additional first compound being some of the first compound that did not separate from the solvent and remain in the initial fraction chamber, and
the outlet portion including an outlet passage through which the solvent in a liquid phase is to exit the collection chamber for recirculation into the SEC; and
wherein, after the solvent exits the outlet portion of the collection chamber and is recirculated into the SEC, the solvent is to enter the supercritical phase to obtain, from the second source material, a second composition comprising the solvent and the second compound, wherein the second composition is to flow into the initial fraction chamber of the collection chamber via the inlet portion and undergo a phase change from the supercritical phase to the liquid phase such that at least some of the second compound separates from the solvent, and a mixture including the solvent in the liquid phase and a remaining amount of the second compound is to enter the secondary fraction chamber via the baffle passage, and as the mixture flows through the baffle passage, the mixture is to drop in pressure such that the remaining amount the second compound is to separate from the solvent, and after the solvent exits the collection chamber via the outlet portion, the solvent is to be recirculated into the FEC.

14. The SFE apparatus of claim 13, wherein the collection chamber is detachable from the frame.

15. The SFE apparatus of claim 13, wherein the baffle passage of the collection chamber is oriented at an acute angle with respect to the inlet baffle wall, and the acute angle is between approximately 30 degrees and approximately 50 degrees.

16. The SFE apparatus of claim 13, wherein the baffle of the collection chamber is a first baffle, the baffle passage is a first baffle passage, and the inlet baffle wall is a first inlet baffle wall, and wherein the collection chamber further comprises a second baffle including a second baffle passage and a second inlet baffle wall facing the inlet portion.

17. The SFE apparatus of claim 16, wherein the second baffle is coupled to the first baffle such that an opening of the second baffle passage lines up with an opening of the first baffle passage.

18. The SFE apparatus of claim 17, wherein the first baffle passage is oriented at a first angle with respect to the first inlet baffle wall, and the second baffle passage is oriented at a second angle with respect to the second inlet baffle wall, wherein the first angle or the second angle is between approximately 30 degrees and approximately 50 degrees.

19. The SFE apparatus of claim 16, wherein an outlet baffle wall of the first baffle is adjacent to the outlet portion and an orifice of the second baffle passage facing the outlet portion is at a same height as the outlet passage.

20. The SFE apparatus of claim 13, wherein the baffle is a first baffle, the baffle passage is a first baffle passage, and the inlet baffle wall is a first inlet baffle wall, and the collection chamber further comprises:
one or more second baffles, wherein:
each of the one or more second baffles includes a second baffle passage and a second inlet baffle wall facing the inlet portion,
each of the one or more second baffles are not coupled to the first baffle or other ones of the one or more second baffles, a region between the first baffle and a first second baffle of the one or more second baffles is the secondary fraction chamber, and additional regions between each of the one or more second baffles except the first second baffle separates the interior of the collection chamber into additional secondary fraction chambers.

* * * * *